United States Patent [19]
Clough et al.

[11] Patent Number: 5,379,057
[45] Date of Patent: Jan. 3, 1995

[54] PORTABLE COMPUTER WITH TOUCH SCREEN AND COMPUTER SYSTEM EMPLOYING SAME

[75] Inventors: William A. Clough, Ontario; Daneil Ouelette, St. Luc Quebec; Serge De La Sablonniere, Ville d'Anjou, all of Canada

[73] Assignee: Microslate, Inc., Brossard, Canada

[21] Appl. No.: 98,219

[22] Filed: Jul. 28, 1993

Related U.S. Application Data

[63] Continuation of Ser. No. 890,311, May 26, 1992, abandoned, which is a continuation of Ser. No. 731,735, Jul. 16, 1991, abandoned, which is a continuation of Ser. No. 271,237, Nov. 14, 1988, abandoned.

[51] Int. Cl.⁶ ............................ G09G 5/00; G09G 5/12
[52] U.S. Cl. ........................................ 345/173; 345/2; 364/705.06; 364/709.11
[58] Field of Search ............... 340/706, 712, 724; 341/23; 364/708, 709.01, 709.06, 709.10, 709.11, 709.12, 709.13, 705.06; 178/18; 224/259, 260, 261, 264, 270, 271, 225, 226; 345/2, 173

[56] References Cited

U.S. PATENT DOCUMENTS

| | | | |
|---|---|---|---|
| 4,159,417 | 6/1979 | Rubincam | 340/706 |
| 4,185,282 | 1/1980 | Pick . | |
| 4,202,041 | 5/1980 | Kaplow et al. . | |
| 4,224,615 | 9/1980 | Penz . | |
| 4,291,198 | 9/1981 | Anderson et al. . | |
| 4,332,464 | 6/1982 | Bartulis et al. . | |
| 4,347,956 | 9/1982 | Berger | 224/257 |
| 4,360,345 | 11/1982 | Hon . | |
| 4,431,870 | 2/1984 | May et al. . | |
| 4,449,186 | 5/1984 | Kelly et al. . | |
| 4,451,895 | 5/1984 | Sliwkowski . | |
| 4,509,526 | 4/1985 | Barnes et al. . | |
| 4,545,023 | 10/1985 | Mizzi . | |
| 4,547,851 | 10/1985 | Kurland . | |
| 4,553,222 | 11/1985 | Kurland et al. . | |
| 4,555,699 | 11/1985 | Citron et al. . | |
| 4,622,437 | 11/1986 | Bloom et al. . | |
| 4,649,499 | 3/1987 | Sutton et al. . | |
| 4,653,086 | 3/1987 | Laube . | |
| 4,659,876 | 4/1987 | Sullivan et al. . | |
| 4,667,299 | 5/1987 | Dunn . | |
| 4,672,558 | 6/1987 | Beckes et al. | 340/712 |
| 4,725,694 | 2/1988 | Auer et al. | 340/712 |
| 4,763,356 | 8/1988 | Day, Jr. et al. | 340/712 |
| 4,775,935 | 10/1988 | Yourick . | |
| 4,782,521 | 11/1988 | Bartlett et al. . | |
| 4,821,029 | 4/1989 | Logan et al. | 340/712 |
| 4,845,650 | 7/1989 | Meade et al. | 364/708 |
| 4,928,094 | 5/1990 | Smith | 340/712 |

FOREIGN PATENT DOCUMENTS

| | | |
|---|---|---|
| 0053061 | 6/1982 | European Pat. Off. . |
| 0271280 | 6/1988 | European Pat. Off. . |
| 424589 | 5/1911 | France ............... 224/270 |
| 2739157 | 3/1979 | Germany . |
| 2156114 | 10/1985 | United Kingdom . |
| 2193023 | 1/1988 | United Kingdom . |
| 8901658 | 2/1989 | WIPO . |

OTHER PUBLICATIONS

Advances in Instrumentation, vol. 42, Part 2, ISA, (Research Triangle Park, N.C., US), P.P. Off: "Human Interface Techniques for Real-Time Global DAta Base Access," pp. 883–890.

(List continued on next page.)

*Primary Examiner*—Jeffery Brier
*Attorney, Agent, or Firm*—Cesari and McKenna

[57] ABSTRACT

A portable, self-contained, general-purpose, keyboard-less computer utilizes a touch screen display for data entry purposes. An application generator allows the user to develop data entry applications by combining the features of sequential libraries, consequential libraries, help libraries, syntax libraries, and pictogram libraries into an integrated data entry application. A run time utility allows the processor to execute the data entry application.

15 Claims, 18 Drawing Sheets

OTHER PUBLICATIONS

Computerworld article entitled "Standing Up For The Touch Screen," Jul. 23, 1984, pp. ID/1–ID4.

Electronic Design article entitled "Software Package Lets PC Control Instruments With A Touch," Oct. 31, 1984, pp. 180–194.

Educational Technology article entitled "A General Issue Examining Aspects of Educational Technology," vol. XXIV, No. 8, Aug., 1984, pp. 27–30.

Control Engineering article entitled "Control Panels: From Pushbuttons to Keyboards to Touchscreens," W. Raymond Flynn, Jun., 1984, pp. 79–81.

BYTE article entitled "The HP 150 Computer," Mark Haas, Nov., 1984, pp. 262–275.

IEEE Communications Magazine article entitled "An Interactive Touch Phone For Office Automation," vol. 23, No. 2, Feb., 1985, pp. 21–26.

Science, Systems & Services for Communications, "An Interactive Touch Phone For Future Offices," To Russell Hsing et al., pp. 272–275, Dec., 1981.

Electronics Review, "System For Terminals Created 'Keyboards' Anyone Can Use," Jun. 5, 1980, pp. 39–40.

Cybernetics and Systems Research, "A Frame-Based Real-Time Graphic Interaction System," Horn, et al., 1984. pp. 825–830.

Product Bulletin entitled "Fluke 1020 Series Touch Control Screen," John Fluke Mfg. Co., 1986.

MAGICSLATE TM

PARKING INFRACTION APPLICATION (C) 1988 VARSTOP INC.
MICROSLATE DIVISION

926 VICTORIA
SUITE #208
GREENFIELD PARK, PQ
CANADA J4V 1M9
(514) 466-8911

OFFICER:
BADGE NUMBER:

DATE:
TIME:
TICKET NUMBER:

GO

NEXT | PREV | ADD | MODIFY | DELETE | FIND | QUIT | SETUP

FIG. 12A

LAS VEGAS POLICE DEPARTMENT

WESTERN STATE:

| NEVADA | CALIFORNIA | ARIZONA | UTAH | WASHINGTON |
| IDAHO | NEW MEXICO | COLORADO | WYOMING | OREGON |
| TEXAS | OKLAHOMA | KANSAS | NEBRASKA | SOUTH DAKOTA |
| NORTH DAKOTA | LOUISIANA | ARKANSAS | MISSOURI | IOWA |
| MINNESOTA | WISCONSIN | ILLINOIS | TENNESSEE | OTHER |

| ANSWER | NEXT | PREV | QUIT |

FIG. 12B

VEHICLE

TAG NUMBER: | TAG YEAR: 89 OTHER

VEHICLE YEAR: 1989 1988 1987 1986 1985 1984 1983 OTHER

MAKE:
MODEL:
COLOR:

ANSWER | NEXT | PREV | QUIT

| INFRACTION | INFRACTION CODE | METER NUMBER | |
|---|---|---|---|
| DESCRIPTION | | TYPE | FINE $ .00 |

LOCATION

NO.
STREET

SIDE
| N | S | E | W |

FACING  NEAR  OPP  INTER  BACK
| □ | □ | □ | □ | □ |

| ANSWER | NEXT | PREV | QUIT |

FIG. 12E

|Infraction|  Infraction code  A-001
Page : 1

```
CODE    DESCRIPTION                                        FIN
A-001   Time Limit                                         35
A-007   Parking more than 72 hours same location           35
A-008   Parking more than 1 hour on public road            35
A-021   Parking with key left in unattended car            35
A-030   Parking over 12 hours on city property             50
A-101   No parking signs                                   10
A-102   No parking - movable signs                         10
A-103   No parking - bus zone                              35
A-117   Parking against traffic                            35
A-105   Parking in front of sidewalk ramp                  10
A-106   Parking in handicap zone                           50
A-107   Parking less than 6.5 feet from hydrant            50
A-108   Parking within 26 feet of street corner            10
A-116   Not parallel-parked to sidewalk                    10
A-1Q4   Parking on sidewalk                                10
A-121   Parking on hill without wheels turned in           10
A-123   Parking in reserved locations                      35
A-125   Illegal parking in parks                           10
```

[PICK] [MOVE] [CANC] [PgUp] [PgDn] [HOME] [HELP]

FIG. 12F

PORTABLE COMPUTER WITH TOUCH SCREEN AND COMPUTER SYSTEM EMPLOYING SAME

This application is a continuation of application Ser. No. 07/890,311, filed May 26, 1992, now abandoned, which is a continuation of application Ser. No. 07/731,375, filed Jul. 16, 1991, now abandoned, which is a continuation of application Ser. No. 07/271,237, filed Nov. 14, 1988, now abandoned.

FIELD OF THE INVENTION

The present invention relates to personal computing using a portable computer having a built-in touch sensitive screen as a combined input/output device, and to computer systems using such computers for remote data collecting and recording.

BACKGROUND OF THE INVENTION

Portable devices for data collection at locations remote from central facilities are now commonly available and becoming common place. These devices include hand-held units and lap-top computers. Hand-held data collection devices typically run dedicated, often single-function applications, which are pre-programmed for specific end uses in specific fields, e.g., traffic citations and inventory taking. Usually data is entered into the hand-held device by bar code readers or keyboards, or a combination of the two. While data entry by bar code reader can be effected swiftly, keyboard data entry frequently bogs down due to the lack of operator skill and the need to enter the data on a letter-by-letter and number-by-number, basis.

Furthermore, typical hand-held devices have limited display screen sizes and limited operating programs. They utilize small memories, read only memory ("ROM") and/or random access memory ("RAM"), in which the collected data is stored until it can be uploaded to a host computer by direct cable connection or modem. The specific application which the hand-held unit is to run typically is stored on-board in ROM.

On the other hand, lap-top computers typically are general-purpose machines which are not application-dedicated. Frequently, lap top computers' display screens are full size or nearly full size, unlike the hand-held units, and usually flip up for use. Entry of information is generally performed using a keyboard which is provided integrally in the lap-top computer's housing or as a peripheral, although other peripheral input devices such as a mouse or touch screen can also be used. Because the lap-top is intended for use while supported on the user's lap, as the name imports, use of a mouse or touch screen is difficult to coordinate or even precarious. In addition, the typical lap top computer's physical characteristics, including its unsymmetrical dimensions, bulkiness, weight, and off-set center of gravity, make use of the lap-top computer unwieldingly in many instances.

For both hand-held devices and lap-top computers, the need to use a keyboard for entry of data is viewed by many would-be users as being laborious or tedious or requiring a skill they have not mastered. This is particularly true for those individuals who are not office workers and have little or no typing skills or who have little or no experience with computers. The computer keyboard can be an intimidating device for them, all the more so when confronted by the traditional typewriter-type QWERTY keyboards.

Also known are systems of point-of-sale ("POS") terminals for use for such diverse purposes as grocery check-out at supermarkets, inventory control, credit authorization or verification or electronic fund transfer. In such systems, the input terminals typically are off-line devices operating limited programs mainly for arithmetic operations, using a keyboard bar code reader or other data entry devices to capture the data for uploading to a central processing computer. Furthermore, such POS terminals typically are disposed for use at fixed locations and, consequently, do not afford the convenience of portability for many applications. For many applications, portability or even ambulatory use is more than a convenience—it is a necessity.

SUMMARY OF THE INVENTION

Accordingly, it is an object of the invention to provide an improved, portable, general purpose computer which permits facilitated data entry, is ergonomically designed in a streamlined case with an integral touch screen for over-all ease of use and economy of effort, and is not unwieldy for the user on the go.

It is yet a further object of the invention to provide an improved system for data collecting and recording which is straight-forward to use for the "man-in-the-street", i.e., requires minimal instruction for use, and requires reduced use of a keyboard for entry of information and data.

It is another object of the invention to provide such a system which also facilitates the process of data collecting and recording, for instance, replacing tedious report writing with a series of simple, speedy, single-stroke entries to choose responses from sets of multiple-prescribed answers that change when necessary, so that the answers in the sets conform to the nature of the questions at hand.

Other objects of the invention will in part be obvious and will in part appear hereinafter.

The invention accordingly comprises the features of construction, combination of elements, and arrangement of parts which are exemplified in the construction hereinafter set forth, and the scope of the invention will be indicated in the appended claims.

Briefly, according to a first aspect of the invention, an improved portable computer is provided which is specifically adapted for facilitated data collection and recordation. The portable computer is self-contained in that it includes in a single compact housing all components necessary for computing—a central processing unit ("CPU"), a memory, an input/output device, a battery pack for power, and preferably, a floppy disk drive or RAM pack.

The input/output device has a touch sensitive screen superposed over a display, for example, a liquid crystal display ("LCD"). The touch sensitive screen is visible and accessible through a window defined in the housing. The portable computer is keyboardless in that it does not require a keyboard for use since it is equipped with the touch screen. Nevertheless, it is provided with connections to hookup an external keyboard as well as a full range of peripherals, and is capable of displaying an interactive, simulated keyboard by means of the input/output device.

For data collecting and recording, the memory of the portable computer stores a data collection application and has locations for storing data entered manually by touching the touch sensitive screen. The data collection application determines the content and format of displays, and can be generated or created on the portable computer or another suitable computer using an external keyboard and cursor control.

The CPU of the portable computer executes the application and processes the manually entered data pursuant to the application.

In accordance with other aspects of the invention, the processor, memory and input/output device of the portable computer cooperate to provide, e.g., multiple-choice questions, multiple-choice/multiple-selection questions, simulated keyboards, sliding scales and libraries, to appear on the display at appropriate times as data entry devices.

In accordance with still other aspects of the invention, data collection is facilitated by using displayed help fields for each question or subject, sequential and consequential libraries, and cross-referencing of entered responses. These features offer particular advantages in expert systems, such as medical diagnostic applications.

Sequential libraries are libraries of possible responses in text or pictogram form stored in fields in memory and fetched with the associated subject or question for display in single column or multi-column format on the display of the input/output device. The user then selects one or more of the listed possible entries by suitably touching the touch screen. The input/output device generates response signals corresponding to each selected response. The CPU causes data corresponding to the response signals to be stored in memory. Preferably, the user can personalize the contents and order of the displayed library entries.

Consequential libraries are similar to sequential libraries except that associated with one or more of the possible responses stored in the memory are actions or executable instructions (e.g., branch, jump, etc.) also stored therein which change the flow of the application. The user selects from the displayed possible responses as described with respect to sequential libraries. However, the selection results not only in data being stored in memory as was the case with sequential libraries, but also in the CPU executing the action associated with the selected response.

Cross-referencing entails the matching of entered responses with a library of possible responses, and, if a match is encountered, displaying the fact of the match, otherwise alerting the user, or displaying information stored in memory fields associated with that library entry.

In accordance with still other aspects of the invention, the display can be personalized to a particular user, can be used to perform spread sheet calculations, can be programmed to have constant fields of information, and can be modified by promoting or rearranging specific subjects or questions.

In addition to the foregoing, the invention embraces a data collection method and system characterized by the above-identified features, and providing facilitated data collection in the field. Such a system includes a host computer for generating the application, and a plurality of satellite computers, each advantageously being one of the portable computers described above, for executing the application received from the host computer, collecting and recording data pursuant thereto, and from time to time, up-loading the collected data to the host computer for further processing and/or storage.

Along these lines, the invention takes advantage of the attributes of the portable computer by providing a carrying case and strap arrangement for holding the portable computer and suspending it from the body of an ambulatory user at a suitable location and orientation for use.

BRIEF DESCRIPTION OF THE DRAWINGS

For a fuller understanding of the nature and objects of the invention, reference should be had to the following detailed description taken in connection with the accompanying drawings, in which:

FIGS. 12A through 12F are illustrative screen displays of a parking infraction application generated by the application generator of FIG. 5 and executed on the satellite computer of FIG. 4A by the run-time program of FIG. 11;

DESCRIPTION OF THE PREFERRED EMBODIMENT a. Portable Computer

Figure 1:
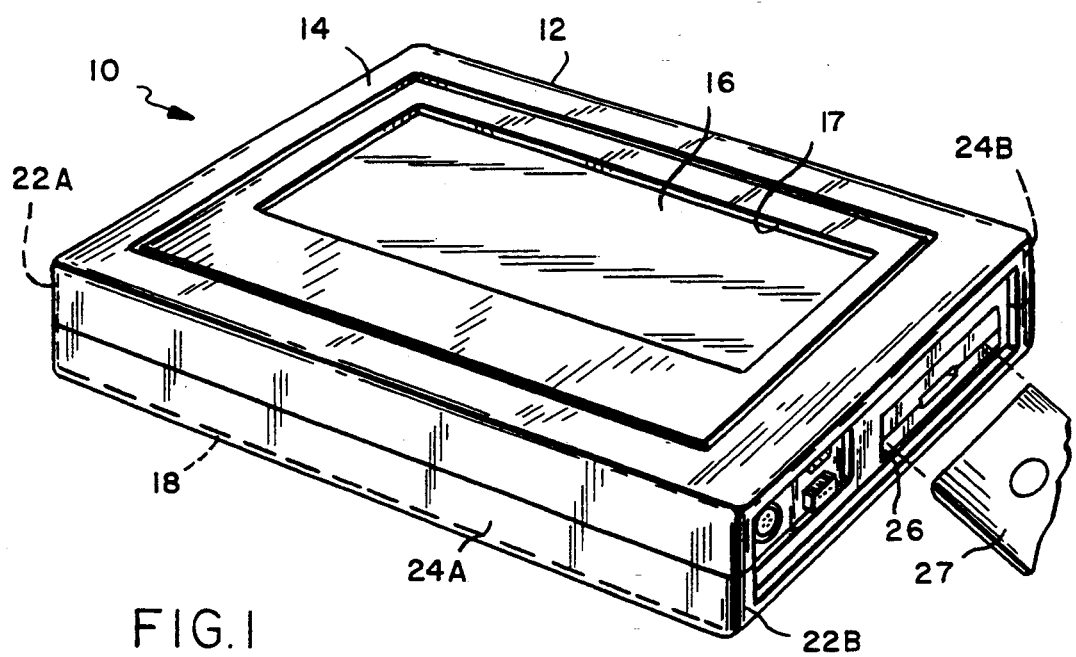
FIG. 1 is a perspective view of a portable computer in accordance with the invention.

FIG. 1 is a perspective view of a portable, general purpose computer 10 of improved design in accordance with the invention. The portable computer 10 is compact, e.g., being $12\frac{3}{4} \times 9\frac{1}{2} \times 2\frac{1}{4}$ inches in size and weighing only 7 lbs. As illustrated, a computer housing 12 is provided, of boxlike form having a generally rectangular, planar top surface 14 incorporating a substantially flush-mounted input/output screen 16. The input/output screen 16 has a liquid crystal display (LCD) with a touch screen overlay.

As illustrated, the input/output screen 16 is visible and accessible through an opening or window 17 in the housing 12, is of generally rectangular form, and comprises a substantial portion of the area of the top surface 14. For example, in the above-mentioned configuration, where the top surface 22 has outer measurements of $12\frac{3}{4}$ inches by $9\frac{1}{2}$ inches and the input/output device 24 has measurements equal to that of the housing window 28, i.e., 9 inches by 4 inches. As such, approximately 30% of the top surface consists of the input/output device 16. In other configurations, this ratio can be as high as, e.g., approximately 40%, with just a minimal case border surrounding the screen 16.

The housing 12 also has a bottom wall 18 parallel with the top surface 14, and substantially parallel left and right sides 22A, 22B, and substantially parallel front and back sides 24A, 24B, respectively. Accessible through the right end 24B is a disk drive 26, e.g., for accommodating a 3.5 inch floppy diskette 27, and a plurality of connectors 38 for connecting peripherals (not shown in FIG. 1).

Figure 2:
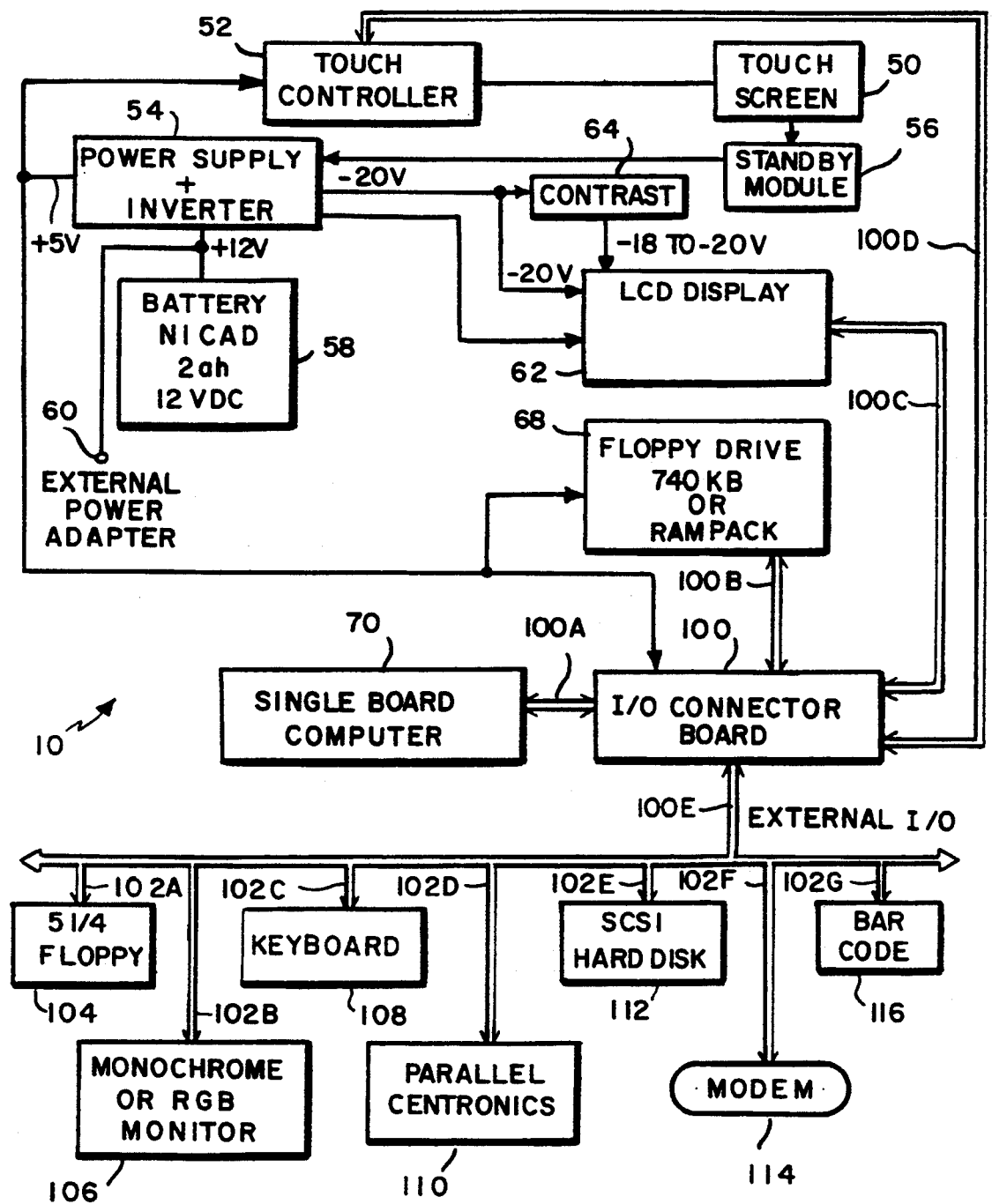
FIG. 2 is a block diagram of the components of the portable computer of FIG. 1, together with selected peripheral devices.

FIG. 2 shows a block diagram of the portable computer 10. The previously mentioned touch screen 50, which, for example, are available commercially from ELOGRAPHICS, Oakridge, Tenn. A touch screen controller 52 is connected electrically to the touch screen 50 for controlling the touch screen 50. Suitable touch screen controllers 52 are commercially available from ELOGRAPHICS Corporation.

A power supply unit and inverter 54 supplies all current for the computer 10. There is a standby module 56 for bringing down parts of the portable computer 10 for power savings, which is connected between the touch screen 50 and the power supply and inverter 24. A battery pack 58 which, for example, is a 12 volt DC, two amp-hour, NiCad pack for supplying power to the computer 10. The battery pack 58 is disposed in an externally assessable battery compartment (not shown). An external power adapter jack 60 is also provided for connecting the computer to an external power supply, e.g., 110 volts, during prolonged office use or as a back-up to the battery pack 58. A display 62 is a backlit, 640 by 200 width display (i.e., 200 rows of 640 pixels each), or a 640 by 400 width display for improved graphic resolution. Suitable LCD's 60 are commercially available, e.g., from OPTREX Corporation, Calif. The LCD 62 is connected to the power supply and inverter 58 to receive −20V DC and 120 VAC at 400 HZ, and to a contrast control 64 for controlling the contrast of the display. The contrast controller 58 receives −20V DC from the power supply and inverter 54 and supplies −16 to −20V DC to the LCD 62 as manually selected by turning a control knob (not shown) on the outside of housing 12.

A drive is generally shown at 68 for a user-transportable read/write memory device such as floppy disk 27 (FIG. 1), or, alternatively, a receptacle with electrical connectors for a RAM pack (not shown), can serve the purpose of storing an application to be run.

Figure 3:
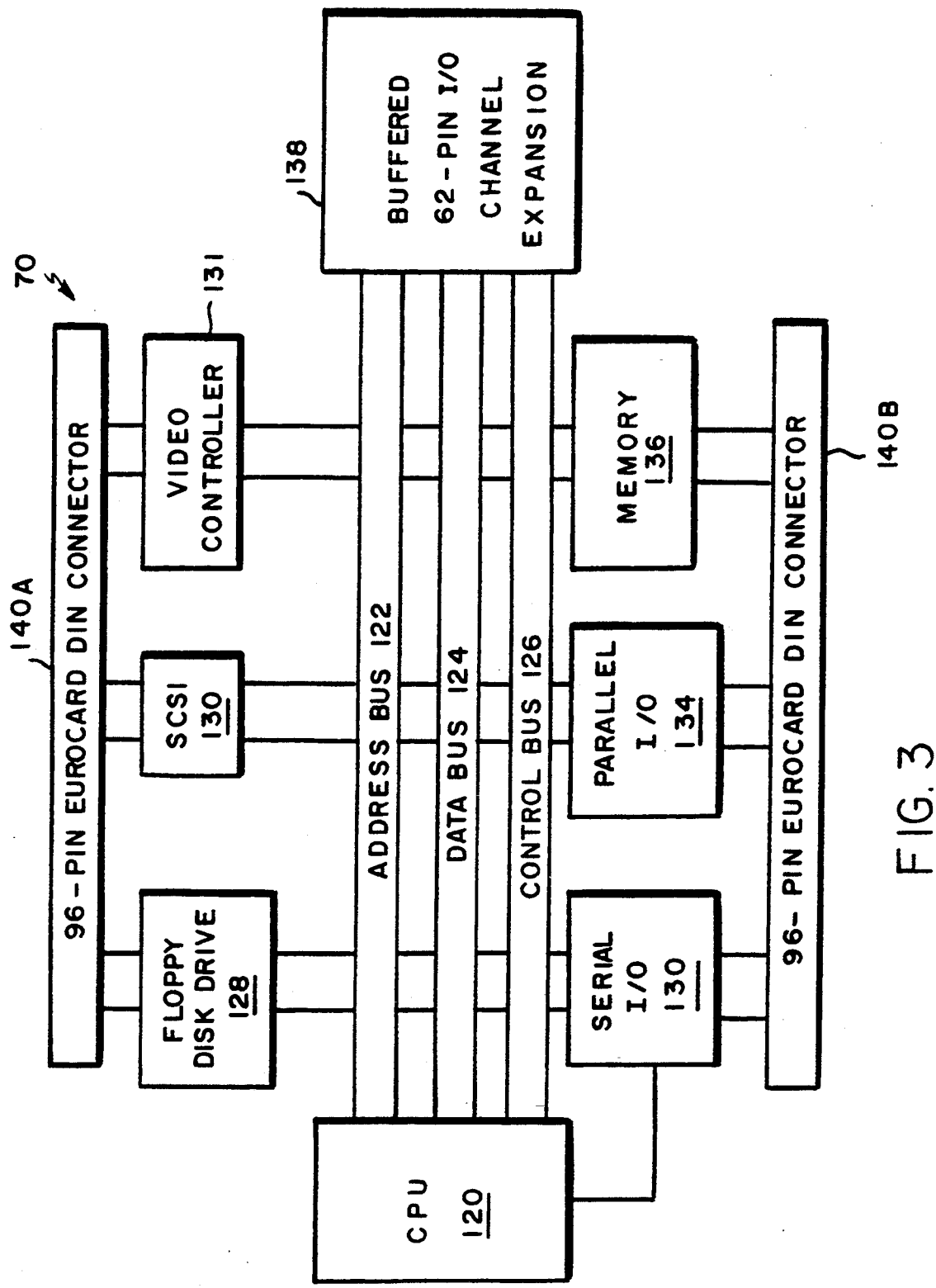
FIG. 3 is a block diagram of the components of a single-board computer of the portable computer of FIG. 2.

A single-board computer 70 which controls all the other components is illustrated in FIG. 3. Suitable single-boards computers 70 are commercially available, e.g., from MEGATEL Corporation, Weston, Ontario. Preferably the single-board computer 70 is of compact design, for example, 6 inches×4 inches. It will be described in more detail shortly.

An input/output (I/O) connector board 100 links the single-board 70 computer to all the I/O devices, and components and controls therefore found within computer 10, including the touch screen 50, touch controller 52, LCD 62 and drive 68. Suitable I/O connector boards 100 are commercially available, e.g., from MEGATEL Corporation.

A plurality of bi-directional buses extend from the connector board 100. A main bus 100A connects the single-board computer 70 with the I/O connector board 100. From the I/O connector board 100 extends a bus 100B which connects the single-board computer 70 to the floppy disk drive 68. An LCD bus 100C connects the LCD 62 with the single-board computer 70. In addition, a touch screen controller bus 100D connects the touch screen controller 52 with the single-board computer 70. Finally, an external I/O connector bus 100E connects the I/O connector board with various input and output lines 102A–102G, each of which permits the connection of a peripheral device.

As shown, line 102A permits connection of a second drive 104, e.g., for a 5¼ inch floppy disk. Line 102B permits connection of an external monochrome or red-green-blue ("RGB") monitor 106. Line 102C is for a communication line or hook-up to a keyboard 108. Line 102D is for connection of a parallel-type printer 110. Line 102E is an external SCSI interface for hooking up an external hard disk unit 112. Line 102F is used to hook-up an external modem 114. Line 102G is used to hook-up a bar code reader 116.

Accordingly, it can be seen that the portable computer 10 is a self-contained, versatile machine for stand-alone operation under the control of its own processor, and/or integration into a system for data collection.

FIG. 3 is a block diagram of the single-board, digital computer 70. There is shown a central processing unit ("CPU") 120, such as is available commercially from NEC Corporation. Within the CPU 120 there are DMA, timers, int. control registers, address decoders and serial I/O devices, which are not separately shown. From the CPU 120 extends several bi-directional buses: an address bus 122 distributes addressing information; a data bus 124 distributes all the data information; and a control bus 126 distributes the control information. Each of these buses 122–126 provide electrical communication to other components of the single-board computer 70. A floppy disk drive interface 128 handles any of a variety of sizes and types of floppy disks, e.g., 3.5 inch and a 5¼ inch diskettes, whether of 300K, 720K or 1.2 meg density. An SCSI 130 hard disk and tape back-up interface is also provided for communication with peripherals. A video controller 131 allows the connection of various display devices, e.g., color graphics display, LCD, etc. A serial I/O communication port 132 is available for modem connection or other serial transmission to a host computer. There is a parallel I/O communication port 134 used to connect a parallel printer. A memory 136 is provided, preferably 512K or 768K of RAM memory and 8K of ROM for maintaining an operating system. The address, data and control buses 122–126 connected to a buffered 62-pin I/O channel expansion 138, which accepts standard expansion boards 140A, 140B. There are also provided two 96 pin EUROCARD DIN connectors.

b. Data Collecting System

Figure 4A:
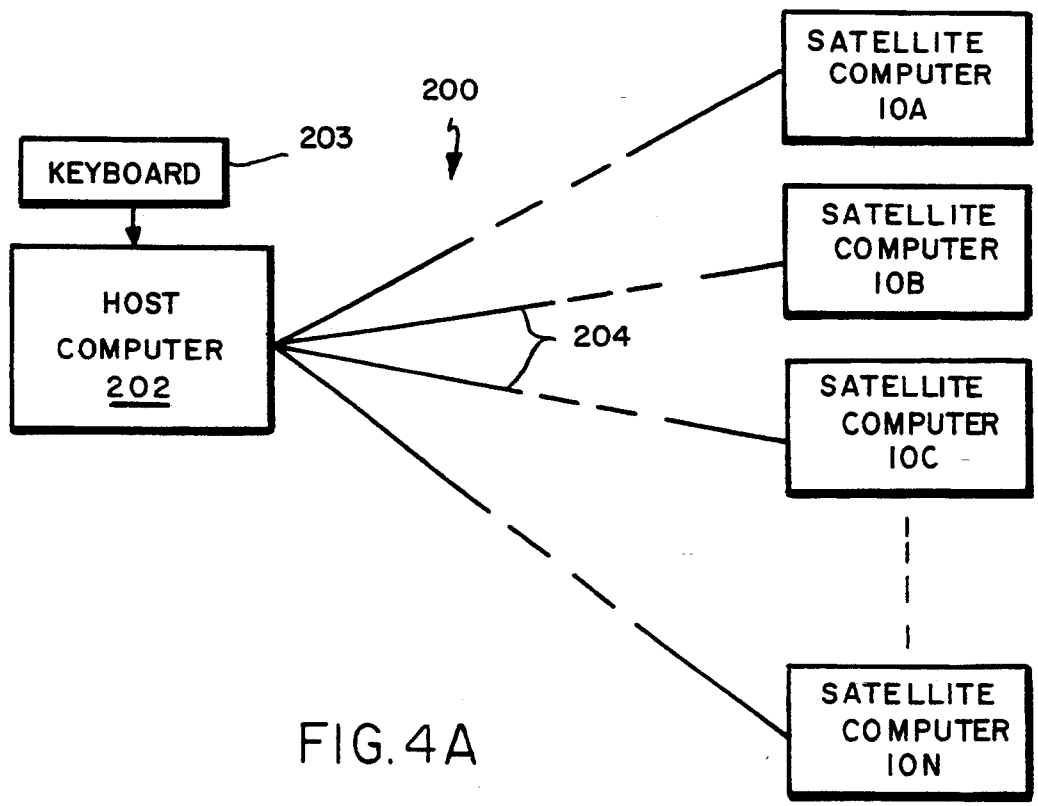
FIGS. 4A and 4B are block diagrams of alternative data collection systems in accordance with the invention.

FIG. 4A illustrates a data collecting and recording computer system 200 in accordance with the invention which incorporates a host computer 202 and a plurality of computers 10A, 10B, 10C, 10D . . . 10N each of which advantageously being one of the portable computers 10 of FIGS. 1–3. Each computer 10A–10N is capable of running a data collecting and recording application independent of the other computers.

The term "satellite" is intended to denote that the computers 10A–10N are normally used independently of the host computer 202 and under the control of their own central processing unit ("CPU"), and are freely portable and mobilely usable. In other words, the satellite computers 10A-10N are intended to be used, for example, while being carried on the factory floor, about a construction site, or in the field, remote from an office.

The satellite computers 10A-10N are only dependent on the host computer 202 for receiving an application from the host computer 202, and for up-loading to the host computer 202 of data collected by the computers 10A-10N. In other words, the application is downloaded from the host computer 12 to, the satellite computers 10A-10N, and then, is run in the satellite computers 10A-10N typically after communication with the host computer 202 has ended. Subsequently, data resulting from running the application is up-loaded to the host computer 202. As such, the computers 10A-10N are intended for use in an "independent mode" under the control of their own central processing unit during field data entry, i.e., when data is collected and recorded or stored therein, and in a "subordinate mode" for application receipt from, and collected data transfer to, the host computer 202. In normal use, the computers 10A-10N are in their subordinate mode during an insubstantial length of time of their use.

The operation and function of the host computer 202 will now be described in more detail. The host computer 202 is responsible for computer-assisted design of the data collecting and recording application to be run on the satellite computers 10A-10N. The host computer 202 runs an application generator program which requires a keyboard 203, full screen with cursor (not shown), etc., by means of which the application designer can design application screen contents and formats for data collection. The application generator program is intended to work on any of a variety of host computers 202, such as (i) the portable computer 10 with suitable peripherals or (ii) any of a variety of commercially available IBM brand or compatible personal computers, mini-computers or main frame systems, using a known operating system, preferably MS-DOS (trademark), which is available from MICROSOFT, INC. The satellite computers 10A-10N preferably use the same operating system as the host computer 202. Once an application is designed by the host system 202, it is then downloaded to one or more of the satellite computers 10A-10N.

The host system 202 stores an application and association libraries in memory locations partitioned by the satellite application generator. The libraries are stored and indexed, for instance, by type, by user, or by company. A whole series of applications and associated libraries can be stored in the host computer 202, any of which being available to be downloaded to one of the computers 10A-10N.

Once the application is downloaded to the computer 10A-10N, the computer 10A-10N is ready to perform data collection. The satellite computer 10A-10N can continuously and repetitively collect data based on the screen content and format established by the application generator. The collected data is locally stored in the satellite computer 10A-10N. When data collection is completed, for instance, once the work day is over, the data from the computer 10A-10N is uploaded to the host computer 202. Appropriate routines are provided to upload directly into the host computer 202, preferably using commercially available databases. At this point, it is up to the operator of the host computer 202 to use the transferred data for whatever purpose is desired.

The uploading or downloading between the host computer 202 and the satellite computers 10A-10N can be performed in any of several ways—by user-transportable means such as a floppy disk, a cable attachable from the host computer 202 to the satellite computers 10A-10N whenever communication is to occur, or a temporary modem connection, or other communication means. Again, this can be done through commonly available hardware and/or communication software. The up-loading/down-loading techniques are collectively illustrated by the dashed line designated 204.

After the application has been downloaded to the satellite computers 10A-10N, the application is executed by a run-time program stored in the satellite computer 10A-10N, and the run-time program is used to input data specified and formatted by the application.

In normal operation, for instance, with the application stored on a floppy disk, the floppy disk 27 is inserted into the disk drive 26 of the satellite computer 10A-10N and the machine can be turned on. Then, the computer 10A-10N will go through its normal boot up process, which does internal verification to make sure all components are functional and automatically brings up the application, ready to use. The user at this time can start entering or correcting the appropriate data for that application and store the data in memory in the satellite computer 10A-10N. After all data is collected for that application or after a pre-selected period of time, the user transfers the collected data back to the host computer 202 where it is uploaded into a host database.

Figure 4B:
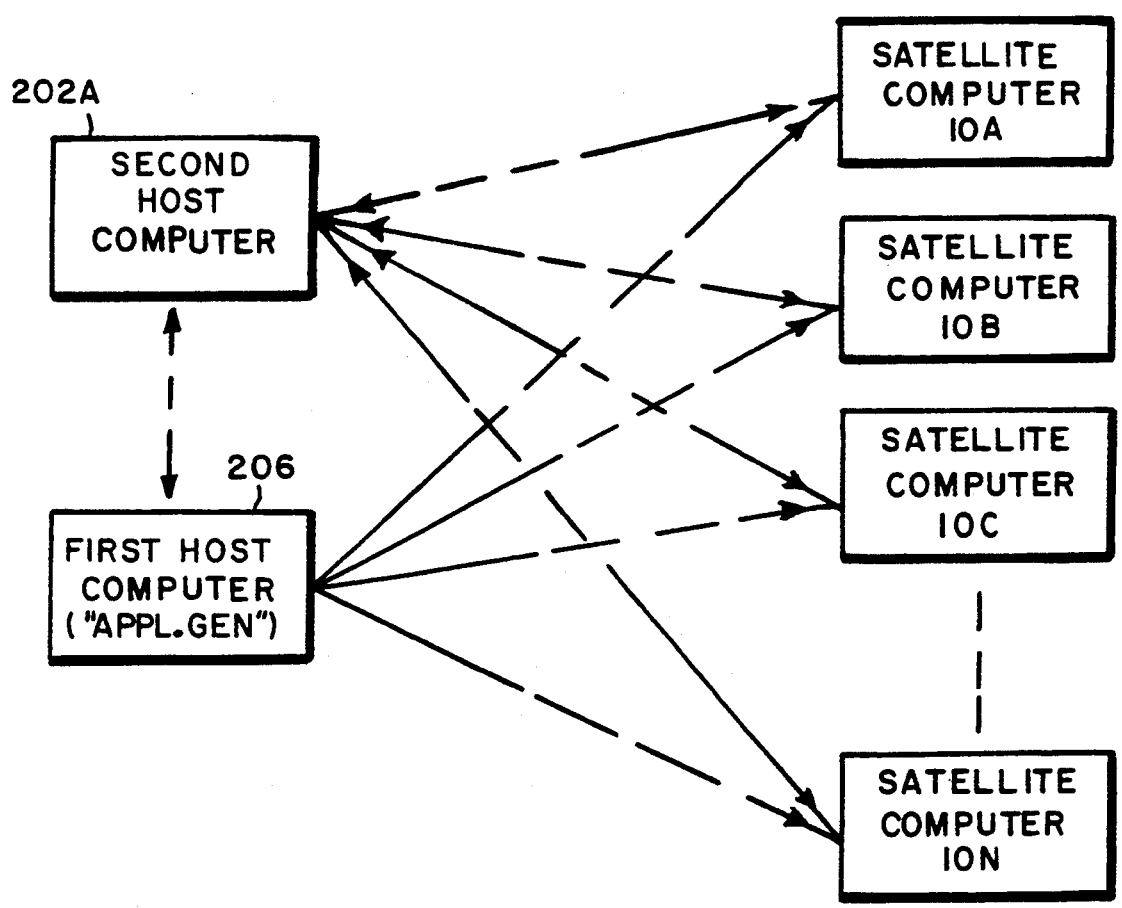

The host computer used to generate the application can be the same host computer onto which the gathered data is uploaded as described above, and depicted in FIG. 4A as host computer 202. Alternatively, and as depicted in FIG. 4B, the latter can be a separate host computer 202A used for data collecting and processing, for example, in operations within a manufacturing facility or other facility. As such, an application generating computer 206 is also provided for down-loading a designed application to either host computer 202A or directed to the satellite computers 10A-10N.

c. Application Generator

Figure 5:
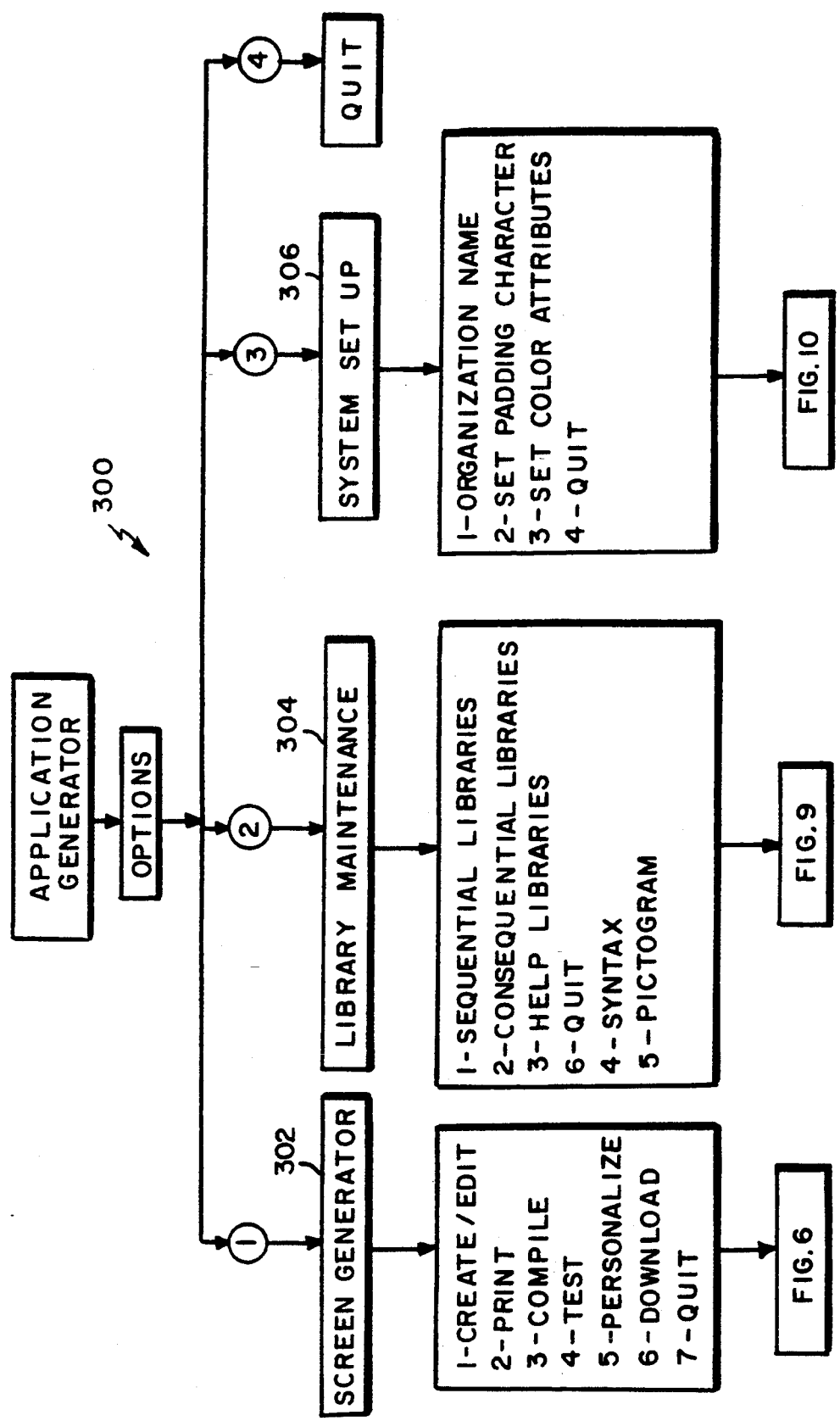
FIG. 5 is a block diagram of an application generator in accordance with the invention, by which the host computer of FIG. 4A generates applications for data collection.

FIG. 5 shows a block diagram of the computer-aided, interactive process 300 for application generation. The process is designed to provide a series of options which are selectable by the application designer. The computer 202 responds to the selection by implementing the selection and storing the result, or offering sub-options for further selection by the designer. This process repeats for each question/answer pair to be included in the application.

Of the several initial options in the application generator 300, a SCREEN GENERATOR 302 is used for designing and maintaining the data collection screens. It has seven sub-options: CREATE AND EDIT 302-1 which is used for actually creating and editing of the data collection screens; PRINT 302-2 which is used for printing out the content and layout of the data collection screens; COMPILE 302-3 is used to compile the data collection screens for down-loading to the computer 10A-10N; TEST 302-4 is used to test the validity of the data collection screen design, e.g., by using a test data collection problem to assure proper functionality; PERSONALIZE 302-5 is used for personalizing the data collection screen to a particular user; DOWNLOAD 302-6 is used to download the data collection screen and associated libraries to the satellite computer 10A-10N.

Another option of the application generator is LIBRARY MAINTENANCE 304, which is used for creating and maintaining libraries which are pertinent to the data collection screen. Within this option are several sub-options: SEQUENTIAL LIBRARIES 304-1 is used to create sequential libraries, which are lists of information; CONSEQUENTIAL LIBRARIES 304-2 is used to create consequential libraries, which are lists of information similar to sequential libraries, but having actions associated with one or more entries in the list, and HELP LIBRARIES 304-3 are libraries that are maintained for each question which give the user a further explanation of the question or the nature of the answer being sought.

The next option of the application generator 200 is SYSTEM SET-UP 306. Within SYSTEM SET-UP option 306 are again multiple sub-options: Organization Name 306-1 inserts the name of the company designing the application, Sub-option 306-2 is used for setting the padding character, i.e., the character that shows up in the answer field of the data collection screen, e.g., a full block character, a period, etc., and sub-option 306-3 allows the setting of the color attribute for the application, i.e., the color sets showing up on the screen at different areas of the application.

Figure 6:
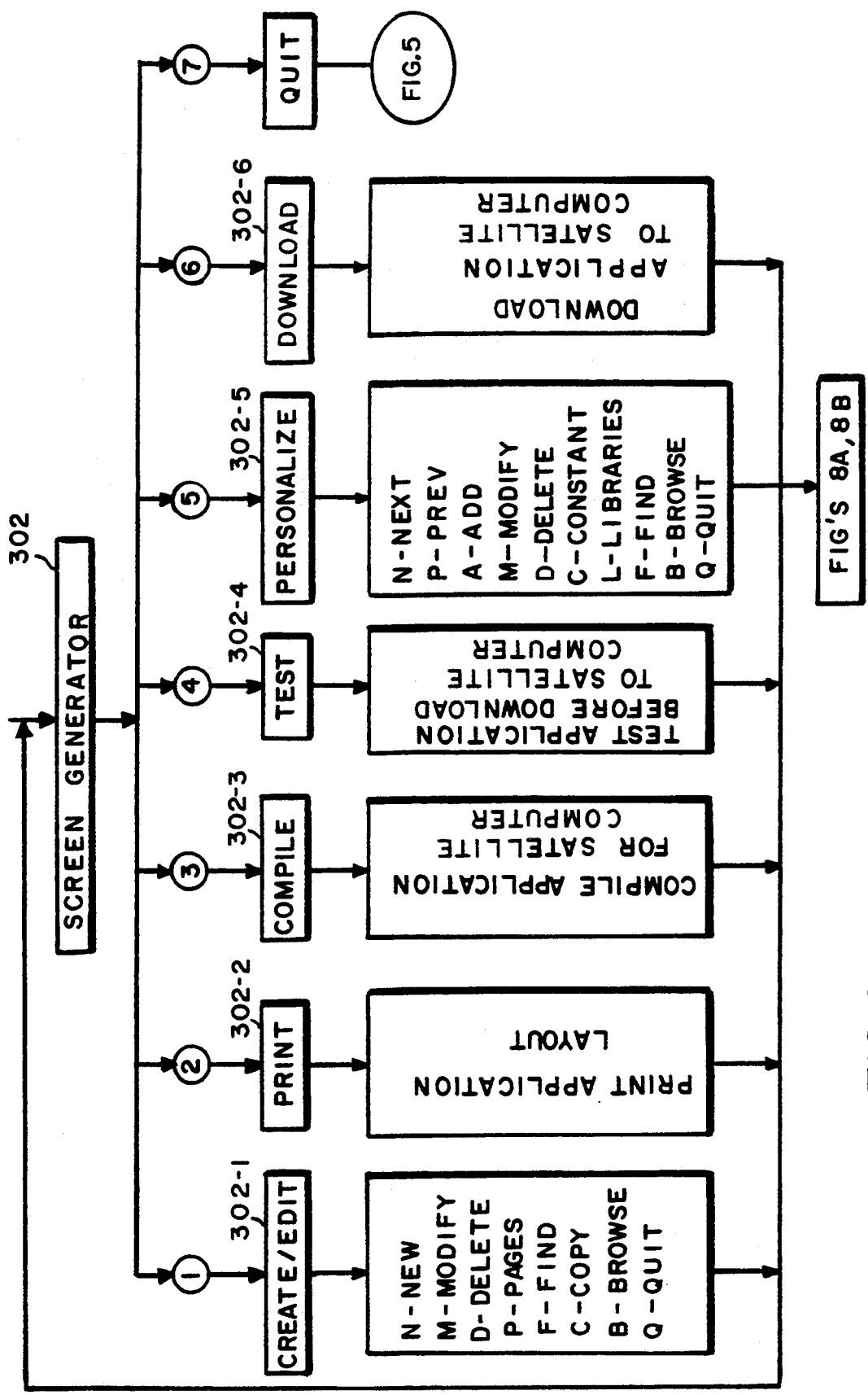
FIG. 6 is a detailed block diagram of the screen generator of FIG. 5.

FIG. 6 is a detailed representation in block diagram form of the screen generator 302 of FIG. 5. Of the sub-options 302-1 through 302-6 described above, only those offering multiple user-selectable functions need to be further described in more detail.

CREATE AND EDIT 302-1 includes NEW which creates a new data collection screen, MODIFY which modifies a current data collection screen which is on file, DELETE which deletes a data collection screen which is currently on file, PAGES which designs the data collection screen with a full page editor, FIND which finds a specific data collection screen that is currently on file and brings it up for display, COPY which copies an existing data collection screen to form a new data collection screen therefrom, and BROWSE which lists the files of all data collection screens which are available for selection.

PERSONALIZING 202-4 offers NEXT which gets the next data collection screen on file in memory, PREVIOUS which gets the previous application on file, ADD which adds personalized information to a specific screen on file, MODIFY which modifies personalized information to a specific screen on file, DELETE which deletes personalized information on a screen on file, CONSTANT which inserts constant information that will always show on-screen regardless of the data gathered during execution of the application, LIBRARIES which personalizes a library for a specific user, FIND finds a personalized screen for a user on file, BROWSE lists all personalized screens on file for selecting of an appropriate one.

Figure 7:
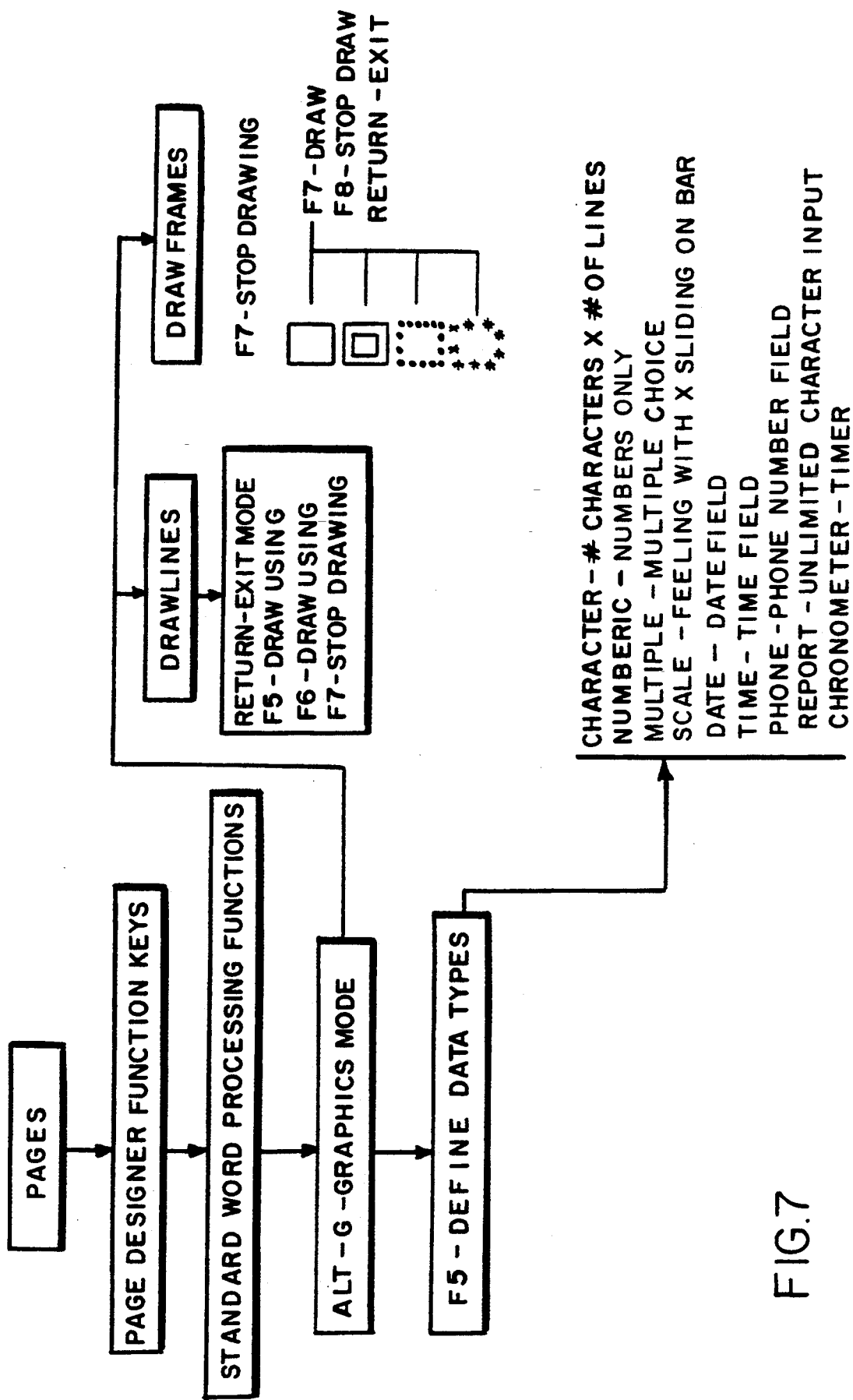
FIG. 7 is a detailed block diagram of the PAGES function of FIG. 6.

FIG. 7 illustrates the devices available for the design of data collection screens using a page designer based around the standard word processing functions found in commonly used word processors, including a page editor with full cursor control. In addition, there are certain functions which are specific to the invention and will now be described. Alternate G is a GRAPHICS MODE. The GRAPHICS MODE is important for creating data collection screens, by controlling the drawing or painting on screen of a line or a frame. If the line option is selected, it allows the drawing of lines on the screen using cursor control, either a full line or a dash line, in the appropriate direction. The DRAW FRAME allows the drawing of boxes or touch points or buttons on the screen. These, again, are user customizable, and disposable on screen at whatever location is desired. Boxes are mainly used in designing answers to multiple-choice questions. Alternate LOOP DEFINITION allows the defining of a looping structure through the questions displayed on the data collection screen. For example, when using a data collection screen, questions one, two, and three can be sequentially answered, and then question four, five and six can form a loop i.e., questions four, five and six require sequential responses and have to be repeated before proceeding to other questions.

The F5 MODE offers several alternative data types, i.e., the nature or type of the answer or data to be entered, such as character, numeric, multiple-multiple choice, etc. It also establishes the input type, indicating where the information will be coming from, such as a library, electronically simulated (QWERTY or Alphanumeric) keyboard appearing on the touch screen, or scale (i.e., an "x" or other character sliding on a bar in response to touching the touch screen), etc.

More specifically, character data types basically involve straight character input. The length of the screen is defined, i.e., the number of characters by the number of lines that the user is allowed to input for a particular answer. NUMERIC INPUT allows entry of numbers only. The MULTIPLE CHOICE ANSWER function can be defined in two ways. First, a single response can be selected from a finite list of possibilities displayed on the screen. Second, MULTIPLE-CHOICE, MULTIPLE-SELECTION permits multiple responses to be selected from a series of choices given to the user on the screen. SCALE can be considered suitable for a "gut feeling" answer. A scale or bar graduated, for example, from 1 to 10 can be provided, which has a marker which moves in response to movement of a user's finger across the bar. This is particularly useful in opinion-oriented answers, such as How much do you like . . . ?. A date field, a time field a phone field, and a report field (essentially similar to the character field except allowing unlimited text input) are also provided. Finally, chronometer/time field, is used in designing data screen applications that deal with timing various events such as in sports or operational efficiency applications, for example, for timing laps.

After defining the DATA TYPE, the INPUT TYPE selects the device to be used by the computer user when gathering data. There are four possibilities: 1) entering text on a keyboard (alphanumeric keyboard, QWERTY keyboard, or numeric keypad), 2) selections of entries from a sequential library, 3) selection of entries of a consequential library, and 4) selection entries from a file.

Figure 8A:
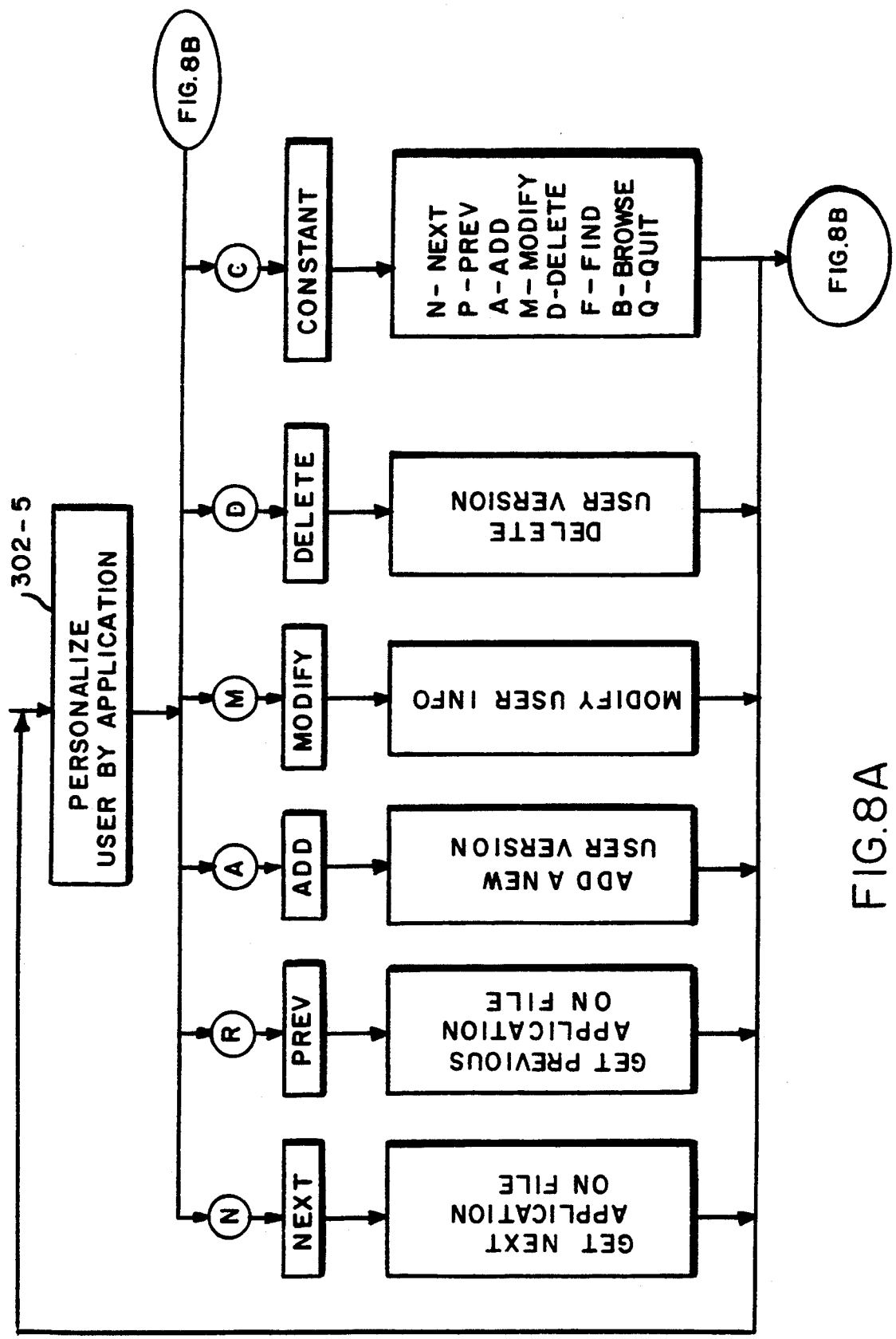
FIGS. 8A and 8B are detailed block diagrams of the PERSONALIZE function of FIG. 6.
Figure 8B:
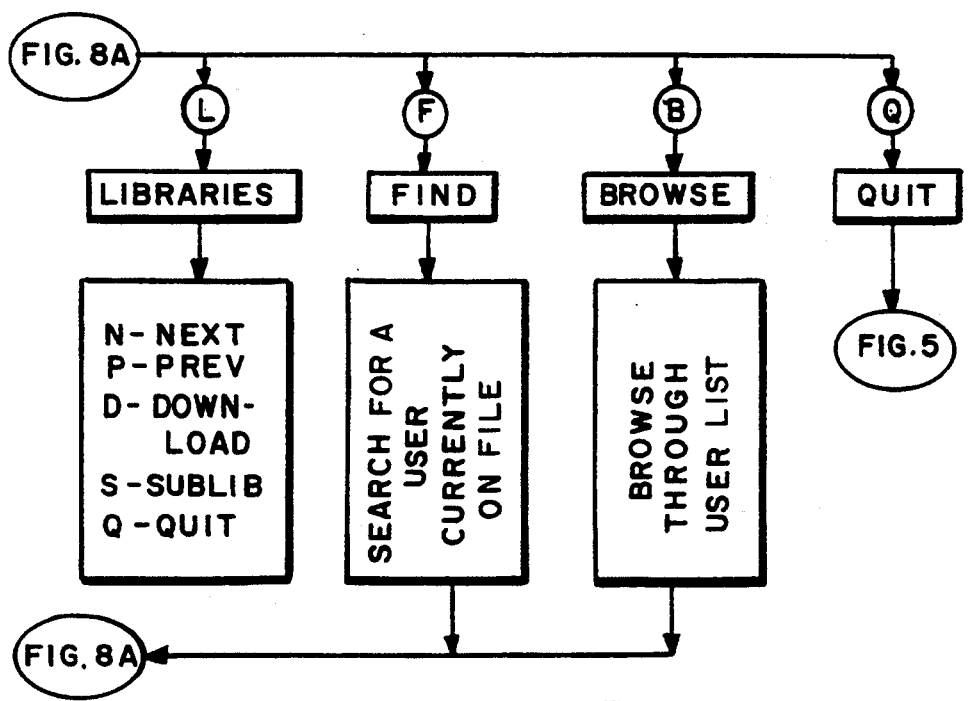

FIGS. 8A and 8B are more detailed block representations of the PERSONALIZE function 302-5 from FIG. 5, whereby an application is personalized for any user. There are several sub-options: NEXT which gets the next application on file, PREVIOUS which gets the previous application on file, ADD which adds a user to an application, MODIFY which modifies the user information within that personalized application, DELETE which removes a user from that personalized application, CONSTANT which is a sub-function of the personalize option which and allows constant information that does not change on an answer-by-answer basis to be continuously displayed on the data collection screen.

Continuing on FIG. 8B, LIBRARY attaches libraries to a specific user's identification, i.e., stores the personalized libraries in memory locations indexed and accessible by user identification. In this way, the user will have available both personalized libraries (that is, libraries which are only available to a selected user), and generalized libraries for the application that are automatically downloaded to all users. FIND searches through memory using a user's identification, and brings up the personalized information for that user. BROWSE lists the personalized files for all users for selection of the appropriate one to call-up to screen.

The CONSTANT option deserves further explanation. It includes several sub-options, including NEXT which permits entry into the next constant field for a selected user, PREVIOUS which calls up the previous constant field for a selected user, ADD which adds a new constant for a selected user, MODIFY which modifies a constant field for a selected user, DELETE which removes a constant field for a selected user, FIND which finds a constant field for a selected user and brings it up on screen, and BROWSE which lists constant fields for a selected user.

To simplify data entry by the computer user, the application designer or the user can display constant information for each one of the answers on the data collection screen—i.e., information which always remain the same for all screens. For example, in a parking infraction application, a policeman's name or badge number can remain the same, so these answers can be identified as constants and automatically will come up on all screens for the particular user/policeman. As such, the user need not enter that information repeatedly. These questions are jumped over during the running of the application. Nevertheless, these constants can be overwritten by the user.

The LIBRARY option of FIG. 8B allows the personalization of libraries for individual users. There are several sub-options, including NEXT which displays the next library for the selected user, PREVIOUS which displays the previous library for a selected user, DOWNLOAD which allows the marking or identification of libraries for downloading for a selected user (i.e., as the libraries are being personalized on a user by user basis, the personalized diaries can either remain on file as dormant or can be marked to be downloaded for a selected user), "SUBLIBRARY" which displays personalized sublibraries for particular users (i.e., libraries can be nested, one within the other, with e.g., two levels of nesting permitted—the main library and personalized or general sublibraries beneath it).

Figure 9:
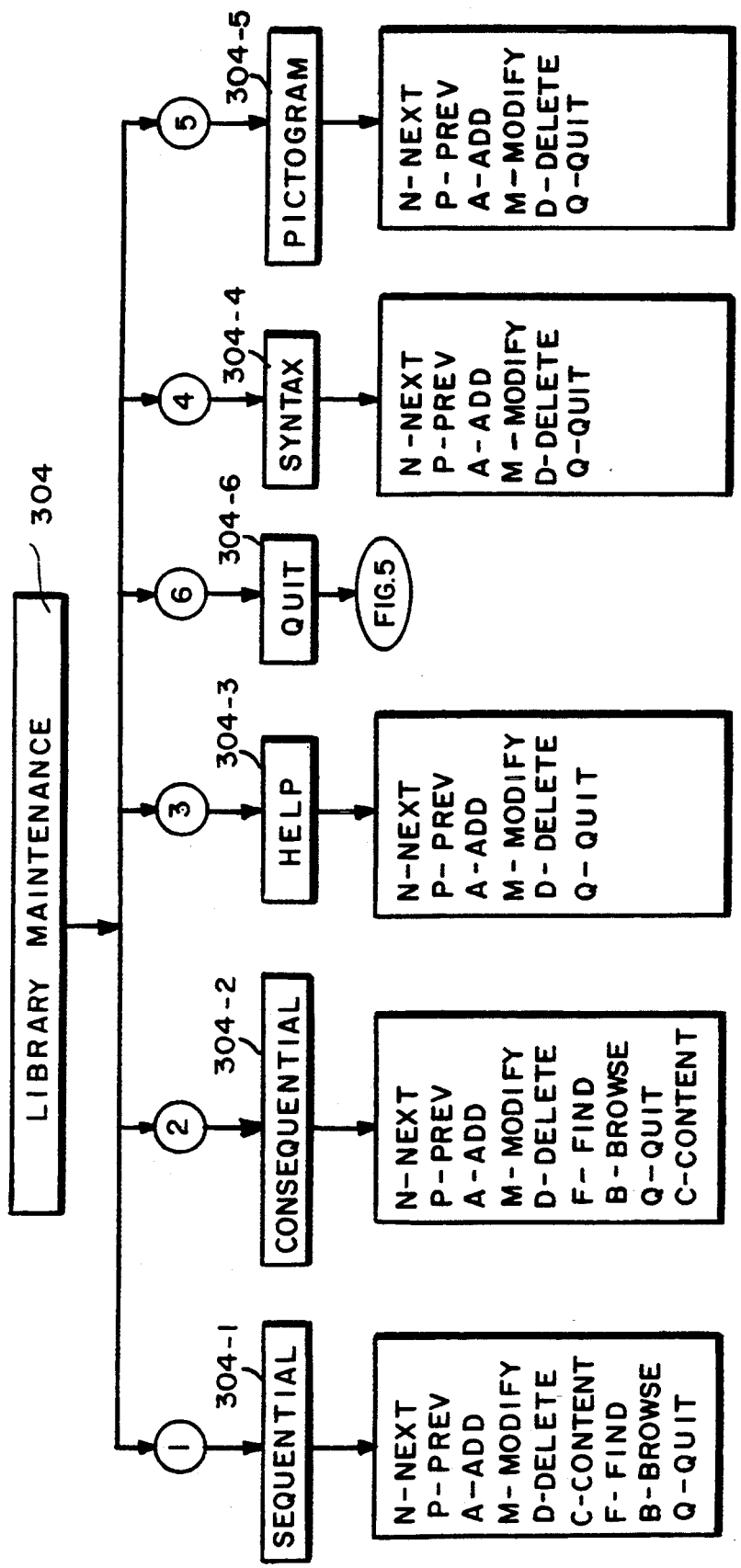
FIG. 9 is a detailed block diagram of the LIBRARY MAINTENANCE function of FIG. 5.

FIG. 9 further illustrates the LIBRARY MAINTENANCE option of the application generator of FIG. 5. This option involves the maintaining and updating of information in a library. Within LIBRARY MAINTENANCE are several sub-options: sequential libraries, consequential libraries, help libraries, syntax libraries, and pictogram libraries.

The sequential library entails: NEXT which displays the next sequential library available on file, PREVIOUS which displays the previous sequential library available on file, ADD which allows the creation of a new library type to be added to the file, MODIFY which modifies a current library that is on file, DELETE which removes a library from file, CONTENT which adds and modifies the actual content of the information within the library (whether single column or multi-column libraries), FIND which finds a specific library and brings it up to the screen, and BROWSE which lists all libraries.

The subfunctions of the consequential libraries 304-2 are similar to the subfunctions found in the sequential libraries, except for CONTENT.

Within CONTENT for consequential libraries of FIG. 9 there are two sets of fields, a data field for the data entry of the library similar to entry fields in the sequential library, and an extra field, which is an ACTION field. Based on the entry of the consequential library that is selected on the touch screen, the content of the data field will be loaded into memory as the answer to that question and the content of the action field for that entry will indicate a specific action for the computer to take based upon that selection, e.g., branch, jump, goto or loop. For example, the action may require answering questions 9 through 12 out of sequence. After the action is completed, the application typically returns to the next question after the one for which the consequential library entry was selected.

A further option is the HELP LIBRARY 304-3. HELP LIBRARIES are maintained and/or customized on a user or application basis. Within this option are suboptions which are analogous to those discussed above; i.e., "next", "previous", "add", "modify", "delete" and "quit".

The SYNTAX LIBRARY 304-4 also has analogous options to the HELP LIBRARY, as does the PICTOGRAM LIBRARY 304-5.

Figure 10:
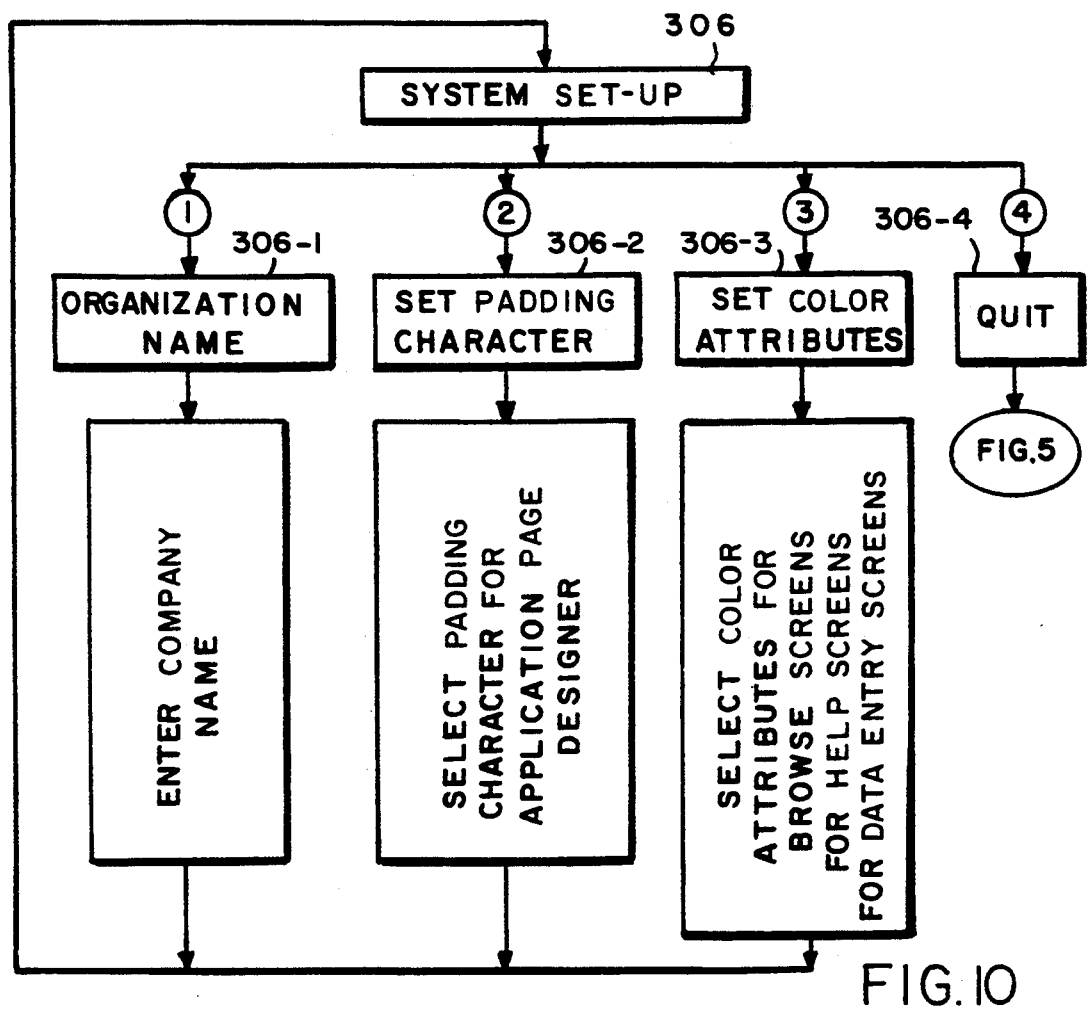
FIG. 10 is a detailed block diagram of the SYSTEM SET-UP function of FIG. 5.

FIG. 10 shows the SYSTEM SET UP options in greater detail. ORGANIZATION NAME 306-1 allows the application developer to enter the company name for a particular application. SET PADDING CHARACTER 306-2 selects the character that shows up on the answer field to indicate where an input is required. The SET COLOR ATTRIBUTE 306-3 selects the color attributes for the browse, help and data entry screens found within the application generator.

d. Data-Collection-Application Execution

Figure 11:
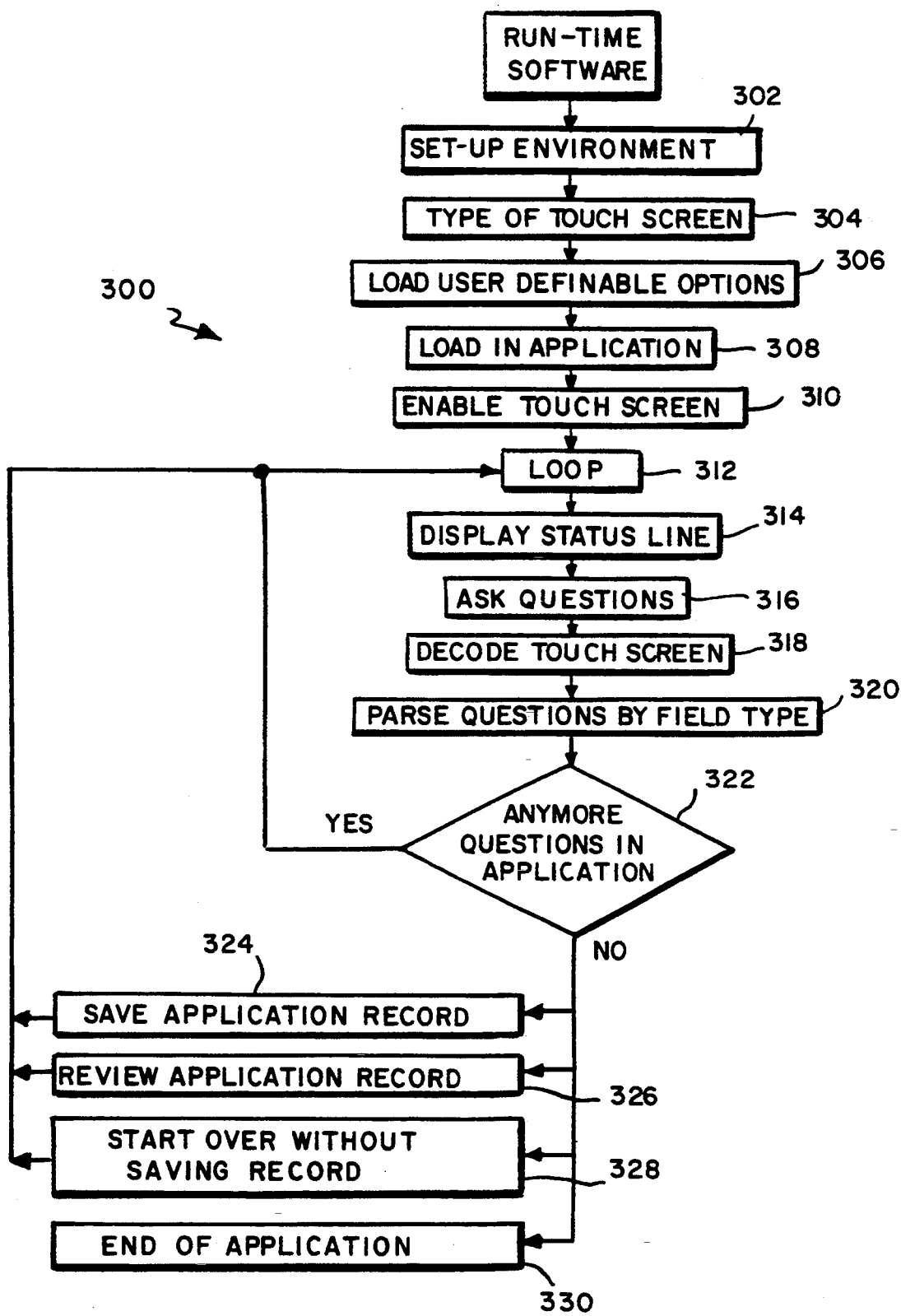
FIG. 11 is a flow chart of the run-time process for executing a data collecting application on the satellite computer of FIG. 4A.

FIG. 11 is a flow diagram of the run-time process 300 by which an application is executed. When the computer 10A-10N is turned on, its operating system is loaded automatically in and the run-time process commences. Upon starting of the run-time process, the first task is to establish environmental parameters (block 302), e.g., to identify the type (e.g., alpha-numeric or QWERTY) of keyboard the user has selected for use on the touch screen, or whether sound should be activated on the touch screen, etc. "Type of Touch Screen" the next block 304, differentiates between the type of computer performing the application, i.e., whether it is a satellite computer 10A-10N, a host computer or other type. "Load Definable Option" (block 306) has several sub-options which are defined by the user himself. User definable options, for example, include the DOS path name under which the data is located on the disk. Another option is for automatic progressing through the application, i.e., after an answer or response is entered, the cursor either automatically goes to the next question or waits for the user to so indicate. The next block, "load in application" (block 308), loads in the application which the computer is to run. During this loading process, several steps are being done, for example, the application screen is being formatted, the answer information and answer types are loaded, including libraries, and looping information is also loaded. The next block deals with the touch screen. Here, the touch screen is enabled or activated to ready it to receive responses.

The next block starts the loop procedure 312. The loop procedure's main function is to go to each question on the data collection screen one by one, interact with the user to get the information, validate the information, and return to the beginning of the loop or exit. Within this loop there are several functions being done. The first block 314 is the "display status line". The status line is a displayed line with a plurality of electronic or simulated buttons (i.e., fields on the touch screen) that are activated by a touch on the screen. These buttons serve the purpose of controlling the flow of information within a data collection system. For example, a "next" button pulls up the next record that is in the computer, a "previous" button, and an "add" button that adds information or new data within the data collection screen.

The "Ask question" block 316 displays a first subject for which a response is required, which is typically referred to as a question. On the first path, the question asked is the first one, on the second path it will be the second question, etc. (It should be clarified that this refers to the logical order, as opposed to positional order of the questions on the screen.

Once the question is responded to, or during the time the question is being responded to, the next block 318 decodes the touch screen to generate an electrical signal corresponding to and uniquely identifying the response, and block 320 parses the questions by type, i.e., determines whether the response is being entered through keyboard entry, through library entry (sequential or consequential libraries), through selection of multiple choice fields, etc.

Once the information is complete, the question is parked depending on the field type that was defined. Parking the question by field type basically takes the answer that was given by the user through the touch screen and verifies that it is a valid answer for that type of field, (e.g., character, numeric, multiple, etc.). Parking is done based on the type of field that was indicated at the time of application design, and if for any reason it does not match with what the user has punched into the touch screen, then the application loops for the correct information.

The next block, which is a decision block 322, checks to see if there are any more questions within the application. If there are more questions to be asked, it loops back, and goes through the loop again. If there are no more questions to be asked, i.e., all data collection screens in the job are totally filled in, then the user can decide on saving the data collected on the screen at that time (block 324), reviewing the data that was entered (e.g., to correct mistakes that have been entered)(block 326), or starting over without saving the record (i.e., the information is useless and should be cleared and redone)(block 328). The last block 330 in this decision is end of application. At this time the user can terminate the application.

e. Further Explanation of Selected Features

Certain features of the application generator and run time program will now be explained in greater detail.

(1) Consequential Libraries

The format or representation of consequential libraries on a data collection screen is essentially the same as a sequential library. The user does not see any difference between them. Both appear as lists of entries in a single column or multi-column form. However, within the run-time process there is a major difference—the consequential library includes data and action fields.

During the application design stage, the application designer can introduce an action attached to one or more entries, or, for that matter, each entry in a consequential library can have a corresponding action. When the user at the time of input on the touch screen selects a specific consequential library entry from the displayed list in the answer field on the screen, an action is returned with the selected entry. The entry is stored as data. The action is then decoded and executed. The action, for instance, can be a "goto", i.e., a jump to a separate screen to process a subcategory of questions related to that library entry. For this, when there is a downloading of the consequential libraries, a sequential list of library entries is downloaded along with the transfer of the associated actions to be executed during the run-time process. The action which is to be executed can also be in the nature of a loop or branch. When the jump or loop or branch is fully executed, then the system automatically returns to the next logical question after that consequential library entry was selected.

For example, where the question asks for an identification of sex, two possible answers are male or female. This could be on a library selection where "male" or "female" shows up on the screen. Subquestions may depend on the answer given to this question, i.e, subquestions for the male category, subquestions for the female category. These subquestions can be set out on separate screens, e.g., on screen number two and screen number three respectively (e.g., "What barber do you use?" can appear on screen number two, "What beautician do you use?" on screen number three) If the response "male" is selected, then the action associated with that entry, for example, would be to jump to screen two for responses to the subquestion related to the answer "male". Once that question is answered, the system automatically returns to the next logical question after the "identification of sex" question.

2. Help Function

Often in data collection systems, the help function is a short statement appearing on the beginning of the application, or explaining each type of answer and, e.g., being displayed on the bottom of each screen.

In the present invention there is provided a full text of user instructions for each question on the data collection screen. At the application design stage, the designer, for example, will prepare help messages or text relating to each one of the questions on the data collection screen. Anytime the user is inputting a response for a specific question, all the user has to do to obtain help is to hit the help button on the touch screen and, automatically, text will pop up on a window and explain, for example, what the nature of the answer should be, or the reason for the question on the screen.

3. Cross Referencing

Cross-Referencing imports that, for each answer field, the entered response can be related to a library to determine if the response in the answer field is existent in the library. In other words, the answer information is cross-referenced against that specific library. If it is available in that library, then, corresponding to that library entry, an action is executed. For instance, the associated action can involve an overlay window that alerts the user of the fact of the match with the library entry, or displays the contents of an information field stored in association with that entry in the memory. The user can then avail himself or herself of that information to make a decision or for whatever other purpose. Thus, cross-referencing results in the typical situation with the display of information.

4. Spread Sheet

This feature allows an application designer to set up a row/column data collection application on the run-time system. Typical usage of this would be, for example, in expense reporting for a salesman. In such an application, for example, across the top of the display is set forth each day of the week and down the left of the screen are is the different expense types to be reported, e.g., travel, meals, lodging. An expense can be entered into the appropriate column and row, for example, lunch on Wednesday. The dollar amount expended for that lunch is automatically tallied—it is added to the current amounts on a net window and is also totalled to the bottom or the right of the screen to show the total amount spent for lunches for that week. To do this, a spread sheet definition on the data collection screen is provided so that the system knows where to add or subtract the information from the collected cells of the defined matrix or array of possible entries.

5. Pictogram Library

The pictogram library is used to store graphical images of objects. A user can select from the pictogram library entries displayed on the screen in graphical images by touching the appropriate displayed pictogram entry.

6. Syntax Library

A syntax library allows the application designer or the user to change the syntax that is being used in the run-time process. Basically, run-time uses a pre-defined syntax which are standard messages that are displayed on the screen to interact with the user. The user or application designer might want to change these messages which can be done going into the syntax library by touching the appropriate button on the screen. The user or application designer can type the desired messages on the screen using a simulated keyboard display.

7. Constant Function

The constant function allows either the application designer or the user to set up certain answers on all screens—i.e., all screens pop up with certain information pre-set on them. This saves time in entering the constant data onto the screen. The constant information is tagged with and ID. This ID is used at the time of upload and·download of the constant information. At download time, the user ID is read from the floppy disk or the RAM pack and all user personalized information is then transferred down to the floppy disk or the RAM pack. In the case of an upload, the same situation applies, if uploading information or data collected from the floppy disk or RAM pack into the host computer, the host system would verify or the upload program would verify the ID, upload the data collected and then, based on the ID, would verify if there were any changes done locally to the libraries on the satellite machine by the user. If there were local changes, e.g., new library entries or promoted information within the library, the ID would be used at upload time to update the libraries in the host computer to keep its libraries in par with those in the satellite machine.

8. Personalization

Personalization is a feature that allows us the user to personalize information that is pertinent to the specific user within the data collection screen. Once the data collection screen is designed it might be in use by multiple satellite computers in the field. It is always the same application data collection screen that is available to the user, but the libraries that pertain to that user can be personalized to account for differences in the area in which the user is working or the user's own preferences. The system designer or user personalizes the libraries. Among the benefits this offers is that the user is not overburdened with library information that is not needed by that user.

9. Multiple-Choice, Multiple-Section

The multiple choice questions are employed by conventional data collection devices. These questions seek and permit only a single response. The present invention employs a multiple choice/multiple selection questions. For example, in the restaurant business where a waiter or waitress is asking a customer for his food order, a multiple choice answer, might be hamburgers, hot dogs, soft drink, milk, coffee. The customer can select hamburger and coffee. All the selections are stored in fields corresponding to the single question being asked.

10. Miscellaneous Features of the Run-Time

These include library modification and promotability of entries on screen. Often in data collection application using libraries of possible responses there are more commonly selected library entries. For example a multiple page library may have entries on page three which are usually selected. It becomes a burden on the user to always page down to the third page to select the entry every time he has to use that library. In accordance with the invention, the user can rearrange the library entries to promote or demote selected entries. For, example, the user can go down to page three, select the entry he wants to promote, and then hit a "move" button. That entry will be automatically promoted to the first entry in the library. The next time the library is displayed for that question, the promoted entry will show up on the first line of the library, and it will be faster to respond to that question.

Another situation that happens in the field is that insufficient entries are within the library. The application designer can only foresee so many possible responses so certain ones may be missing. In accordance with the invention, the user can add new entries into the library so that the next time the library is called up for that questions, the information will be available automatically. The user can then simply touch the entry to record his response, rather than having to type it in, using a simulated keyboard.

For both of these library field modification, the corresponding libraries on the host is automatically updated the next time the collected data is up-loaded. The ID that is tagged onto the floppy disk or RAM pack is used to identify the host library, and each satellite library is cross-verified with the libraries on the host computer at up-load. If any modification has been performed in information those libraries, then the host library updated to reflect the modifications for that user.

FIGS. 12A through 12F shows various illustrative interactive screen displays from an exemplary data collection application entitled "Parking Infraction Application" It is the type of data collection application which a traffic policeman would use.

FIG. 12A shows the starting screen for execution of the application. The officer's name and badge number are preferably constant fields. The date, time and ticket number are filled in. Assuming a new infraction is to be entered, the add button is pressed.

FIG. 12B shows the next screen of the application. It calls for an identification of the state issuing the license plate on the vehicle. The required information is entered by touching the appropriate active target of the screen enclosed in one of the illustrated frames.

In the screen depicted in FIG. 12C, the vehicle year is entered by pressing the appropriate frame, and other information concerning the vehicle is entered, for example, by using a simulated keyboard.

Figure 12D:
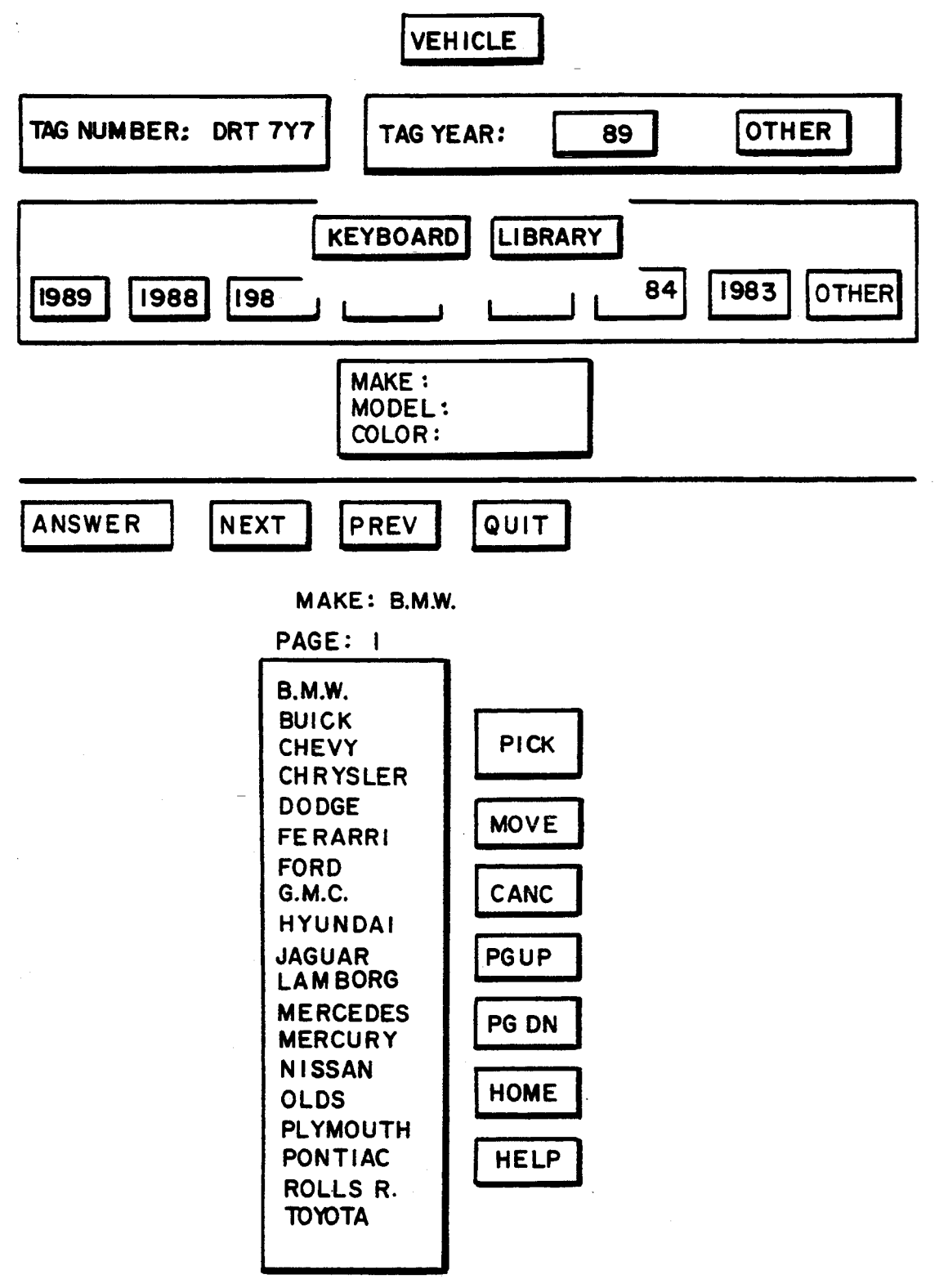

FIG. 12D shows yet another screen. Here, instead of using the simulated keyboard to enter the model, a window is opened containing a library of possible models. Any of these can be pushed by touching the appropriate point on the screen.

FIG. 12E seeks further information concerning the information, and can be completed using one or more of the above-described data entry devices. The infraction code is contained in a displayable library shown in FIG. 12F. One a code is selected from the library of FIG. 12F, the code field, the description and the fine are automatically entered on the FIG. 12E screen. To further clarify the application generator process, appended hereto and made a part hereof is an illustrative application generation guide.

f. Carrying Case

Figure 14:
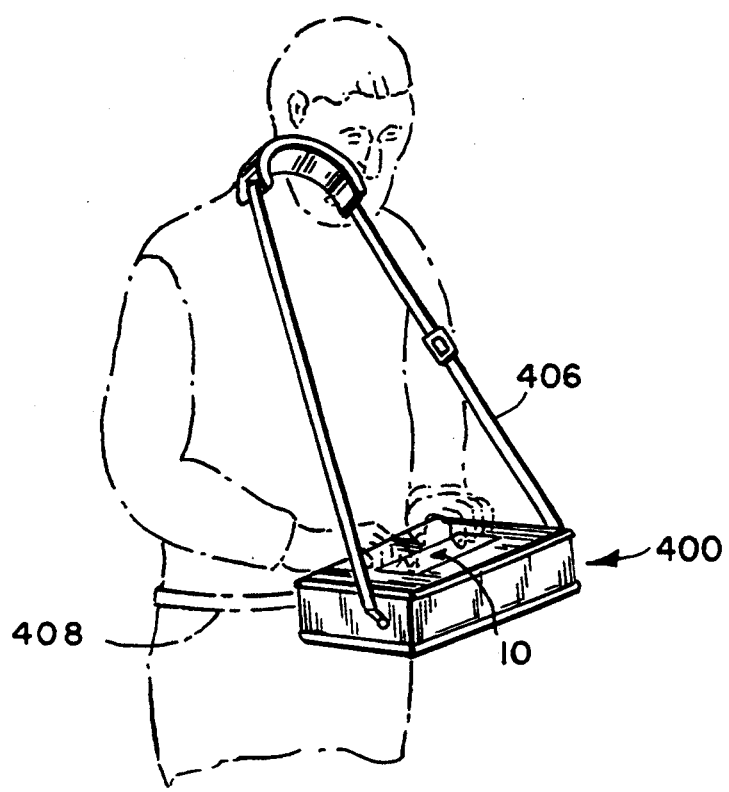
FIG. 14 is an illustration of ambulatory use of the portable computer of FIG. 1 made possible by the carrying case of FIG. 13.
Figure 13:
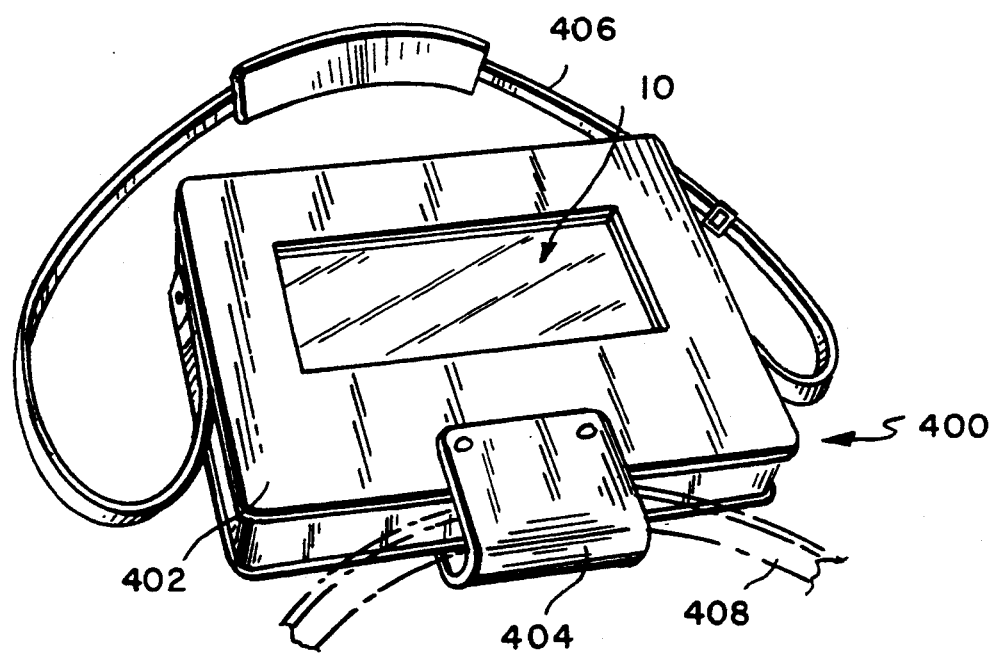
FIG. 13 is a perspective view of a carrying case for the portable computer of FIG. 1.

FIGS. 13 and 14 show an optional carrying case 400 for the portable computer 10, preferably made of leather or similar material. The carrying case 400 has a receptacle portion 402 for snugly receiving the portable computer 10 in a protective manner. A re-sealable flap 404 can be used to close the receptacle portion 402 after the portable computer 10 is inserted therein, and/or is otherwise provided for purposes to be described shortly. The flap 404 forms a flat loop of material which is attached at one end to the receptacle portion 402, provided with a snug connector at its other end to releasably secure that end to the receptacle portion 402. Also provided is a carrying strap 406. The carrying strap 406 is secured at each of its ends to the receptacle portion 403 nearer the top side of the computer housing. The flap 404 is disposed proximate the bottom side of the computer housing.

Of course, the carrying strap 406 can be used as a shoulder strap to carry the portable computer 10. However, this arrange is specifically adapted for ambulatory use of the portable computer 10 as illustrated in FIG. 14. For such use, the carrying strap 406 is placed around the neck of the user with the portable computer comfortably located for use in front at waist height. The user places his belt 408 through the loop of the flap 404. Thus, the portable computer is suspended from the user's neck and maintained substantially horizontal or slightly tilted at an appropriate angle for use by the three point action of the ends of the strap 406 and the user's belt 408. In this fashion, the user has both hands free to use the portable computer 10 while he stands or walks about.

It will thus be seen that the objects set forth hereinabove, among those made apparent from the preceding description, are efficiently attained. Also, certain changes may be made in the above-described construction without departing from the scope of the invention.

Therefore, it is intended that all matter contained in the above description or shown in the accompanying drawings shall be interpreted as illustrative and not in a limiting sense. It is also to be understood that the following claims are intended to cover all of the generic and specific features of the invention herein described and those made obvious herefrom.

APPENDIX

ILLUSTRATIVE APPLICATION GENERATION

CHAPTER 1: THE BASICS 1.1 The System

The system consists of three entities: DataSlate TM, MagicSlate TM, and Datellite TM. The first two are software, and the third is hardware.

DataSlate TM is used to design applications from scratch. This chapter introduces the fundamentals of DataSlate TM.

MagicSlate TM runs the final compiled versions of the applications on Datellite TM's touch-screen.

Datellite TM is a keyboard-less MS-DOS computer equipped with a 3½" disk drive. You also have the option of attaching an external hard disk, your own video, bar code reader, telephone modem—anything you can attach to any micro. Adding your own screens or keyboards gives you a regular PC.

Application designers will be primarily concerned with DataSlate TM.

1.2 What is an Application?

The basics of designing applications can be summarized in the following single sentence:

"The application is a series of multiple-choice questions."

For example, FIG. 1.1 below presents a simple, two-question application which might be used in a survey to determine the percentage of males and females who own computers:

```
1. What is your sex?      | Male |     | Female |

2. Do you own a personal computer?   | Yes |   | No |
```

FIG. 1.1

Since Datellite TM employs a sensitive touch-screen, the person using your application selects answers to the questions with the simple touch of a finger on an active area which is delineated by a frame on-screen.

1.3 Elements of an Application

An application consists of the following elements:

Pages and Answers

A page is a standard screen consisting of 25 lines each with 80 characters. Each page contains questions in the form of simple text and corresponding answer fields such as in FIG. 1.1. You simply type in the questions which are, in actual fact, ignored by DataSlate TM. The answer fields, however, are the crux of the application, and are covered in Section 1.4.

Libraries

Some questions may have a large number of possible answers, such as the question, "Which state do you live in?". You wouldn't want to type in the 50 states enclosed in frames on screen as in FIG. 1.1, because for one thing, there would not be enough room on one page. What you would do is store the list of the 50 states in a library. Libraries are the subject of Section 1.5.

1.4 Answer Fields

Once you type in the question to be answered, you then define an answer field to accommodate the reply to be entered by the user.

DataSlate ™ has the following eight answer types available:

"Character" for character string answers;

"Multiple", for answers to be shown on screen as choices inside of square frames (as in FIG. 1.1);

"Numeric", for answers that are to be strictly numbers;

"Scale", for questions that beg more indefinite "touchy-feely" answers. For example, consider the question 'Condition of Auto', where approximate answers would be entered by sliding an "x" along a scale with "Wreck" and "Mint" at each end.

"Date", "Time", and "Phone", for answers that are to be of those forms; and

"Report", for answers requiring several lines of text.

Depending on which answer-type you choose, there might be values to assign to various parameters.

For example, consider the question "Year". The answer type, taking the example of the car, would be numeric. Some of the parameters for this answer-type include its format (how many digits permitted in the answer?), the range of years over which the response would be accepted as valid, and whether a library is to be accessed.

1.5 Libraries

DataSlate ™'s Golden Rule:

> Avoid keyboard-oriented answers!

The raison d'être for Datellite ™ s is to make computers easy to use for everyday people and especially computerphobes, and computerphobes are largely keyboard-phobes.

The way to avoid the use of the keyboard in any given application is to make frequent use of libraries.

In the car example, the question "Year" asks for the year in which the car was built. Instead of having the user call up the keyboard and type in '1', '9', '8', and '9', a library consisting of entries '1965' through '1989', say, could be displayed instead. The user would then select the appropriate year from the list on-screen with the touch of a finger!

There are three types of libraries:

the Sequential libraries (and their sub-libraries), which hold lists of answers and perform no subsequent function;

the Consequential libraries, which hold lists of answers and can affect the flow of the application. That is, the next questions asked are dependent upon the previous answer selected.

For example, consider the question "Which state do you live in?" If the user answers "New York" to this question the application would then switch to an area that had questions and answers specific to New York. If, however, the answer us any other state, the New York questions and answers would then be inappropriate and therefore not come up on screen.

the Help library, which contains all of the Help messages that you create for your end-users.

1.6 Logical Flow of Applications

The logical flow of your application is controlled by a parameter common to each answer field: the GoTo parameter. This parameter determines the next question to be asked in the application. Each question is also assigned a Sequence Number used by the GoTo parameter.

In the example of FIG. 1.1 above, question 1's GoTo parameter would be simply "Next Question". Question 2's GoTo parameter, being the final question of this short application, would be "End Program".

1.7 The Pop-Up Keyboards

Some questions will require input from a keyboard. For these question, the Datellite ™ comes equipped with a keyboard that is produced on-screen for the time necessary to enter the answer. The user keys in the answer on the touch-screen, and then the keyboard disappears until needed again.

By the way, two types of keyboards are available for the end-user to choose from: QWERTY for those familiar with a typewriter keyboard, and ALPHA for those who are not.

CHAPTER 2: DESIGNING AN APPLICATION

By following the steps outlines in this chapter, you will create an application using DataSlate ™.

2.1 The Application

Consider the situation where a survey of different residential districts is to be performed. This analysis might call for the following information to be recorded relative to each household visited;

the district name;

the age, gender, and job status of each adult living in the household;

the number of children living in the household; and the general condition of the property.

2.2 A Note About Questions and Answers

The first step in designing an application is comprised of drafting the questions and defining the formats for their answers.

What you must be aware of here is that we are using the term 'question' quite liberally. When we say 'question' we mean literally any kind of text because, quite simply, DataSlate ™ does not take this text into account.

Questions are only for the benefit of the user.

For example, we can format multiple choice answers in such a way that no question-text is required. FIGS. 2.2 and 2.3 below illustrate this important point.

| Gender: | Male | Female |

FIG. 2.2

In this example, the question is implied in the multiple-choice answers presented, and no one would have any difficulty in ascertaining that the question was "Gender:" if, as FIG. 2.3 shows below, the question-text was eliminated.

| Male | Female |

FIG. 2.3

Now, let us proceed with the design of our application. You may have realized that we have already drafted one of the questions of our application, the gender of an adult living in the household.

If you have not already done so, bring up DataSlate™'s Main Menu by entering the command
DATASLATE at the C> prompt in root dictionary.

2.3 Important Keys

Before going any further, we should tell you about some of DataSlate™'s most important keys:

<F1>→ The <F1> SKIP-INPUTS key is used to skip an entire set of input parameters and move on in the program. It has the same effect as pressing <RETURN> as many times as there are parameters left to answer, basically skipping over them all automatically.

<F2>→ The <F2> HELP key can be used practically anywhere to call up Help text about the section of DataSlate™ you happen to be in at the time. This Help text is displayed in convenient windows, and there may be one, two or three windows of such text. The first window is generally a hint screen. If you need more detailed information go to ensuing screens (if available by pressing <F2> repeatedly. Pressing any other key will get you out of the Hint or Help text and back to where you were prior to pressing <F2>.

<F4>→ The <F4> EXIT key is used to exit various sections of DataSlate™, such as Loop definition, Library building, and the Page Designer.

<ESC>→ Pressing the <ESC> CANCEL key will cancel any function you are in at the time you press the key, and where applicable, will also return you one level back through DataSlate™.

<ARROW>'s→ You may use the <ARROW> keys to maneuver your cursor among DataSlate™'s input parameters. Whenever there is a set of inputs on screen, the <ARROW> keys can be used to move the cursor among the various inputs. They are used to skip inputs or to go back to an input and correct what you've just entered.

2.4 Designing the Application

Now choose an option form the Main Menu on screen. The way to do this is to scroll the light bar onto the option you wish to choose using the <ARROW> keys, and press <RETURN>. Another way is to simply enter the corresponding number of the option.

The option you want to select is "1-Application Generator".

This is the Application Generator Menu. The first option, "1-Create/Edit", is to be chosen to begin designing our application. Select it by pressing <RETURN>.

CREATING THE EMPTY APPLICATION

The "Create/Edit Applications" screen should now appear. The eight-option menu near the bottom of your screen contains the option "New". The light bar is already positioned on it, so simply press <RETURN> to register this option as your choice.

A cursor appears next to the label, "Application Name". The space that the cursor is in is called a parameter, which currently has no value. Enter the name of your new application "Survey" here and press <RETURN>, Next, skip over "Application Type" for this demonstration (by pressing <RETURN> over the word "General"), and enter your own name in the "Author" parameter.

The "Creation Date" has already been filled in for you (using your operating system's value), but you can change this to any date you wish.

The "Description" parameter is there to briefly comment on the purpose of your application and is used to further tell this application apart form others. You may enter something like, "Survey of persons living in households in certain districts" to describe this one.

We'll ignore the remaining parameters as they pertain to the eventual distribution of the application. Press the SKIP-INPUTS key <F1> to get out of this editing stage and back to the eight-option menu. The <F1> key can be used like this whenever DataSlate™ has many input parameters for you to do but you have nothing to enter, as in our case here.

If you've made any mistakes, select the option "Modify" to re-edit the above parameters. Remember that whenever you use the option "Modify" (as well as "Delete" and "Copy"), there must be an application displayed on screen, or else you will get the error message "** No application available". In such a case, use the <UP-ARROW> and <DOWN-ARROW> keys to scroll through and display existing applications, or select the "Find" option and key in all or part of the application's name that you wish displayed.

Having created the identification for our application, we now need to create the actual questions and answers, and to do this we need the Page Designer which is accessed by the option "Pages".

THE PAGE DESIGNER

The light bar should already positioned on the option "Pages" (this is automatically done after a new application is created). Select this option by pressing <RETURN>.

Generally, applications consist of a number of sequential pages, with each page consisting of 20 lines. We'll fit this application on one page.

The top 20 lines of the Page Designer is where our application will be designed. The last 5 lines are status lines belonging to DataSlate™ and used for various counters and messages.

One feature of the Page Designer is a basic word processor, and whatever we type here will be displayed to the user in exactly the same form.

Knowing this, we can begin the design of the actual appearance of our application with the introduction of the function key we will be using the most: <F5>, the answer Formatter. We will use this key to access the Answer Formatter which we will use to define the formats for our answer.

THE FIRST QUESTION

Now, let's define the first question.

Let's say the first piece of information required in the survey is the district name. We first word the question so the user will know what is to be entered. The question's wording is kept simple and obvious: "District:" will do just fine. Type this in on the first line of the Page Designer. Do NOT press <RETURN> because we wish to place the answer field right next to the question (look ahead to FIG. 2.9 to see what our goal is—but don't worry about centering the question on screen yet!).

Next, we want to define the answer to the question. Place the cursor exactly where you want to position the answer (say, two spaces after the colon next to the word "District"). Now, press <F5>.

THE ANSWER FORMATTER

The "Answer Formatter" window will appear.

There are 3 parameters to define here: Answer Name, Question Sequence number, and Answer Type.

Assuming that you did type in the word "District" a minute ago, you will find that the Answer Name has that value already (as in the figure). If not, type in "District" next to the "Answer Name" label. Whatever the case, press <RETURN> to proceed to the next parameter.

You will find that the Question Sequence number has the value of 1, since this is the first answer you have defined. This number is used to determine the order of questions asked. Therefore, the question "District" will be the first question asked during the survey because its Question Sequence number is 1. Press <RETURN> to accept 1 as the Question Sequence number and to continue to the third parameter.

"Answer Type" consists of an eight-option menu of all possible types. As in all menus, the light bar is controlled by the <ARROW> keys. The answer to the question "District" is to be of type character. After making sure the light bar is high-lighting the option "Character", press <RETURN> to register it as our choice.

Eight more parameters will appear in a second window.

We assume that no district's name shall be more than 20 characters in length. Enter 20 in the space next to "Characters per Line" and press <RETURN>. We will only need 1 line of 20 characters, and so just press <RETURN> next to "Lines" since the number 1 is already there.

LET'S USE A LIBRARY

Press <RETURN> seven times now to skip down to the "Entry Method" parameter. (IF you presses <RETURN> too many times causing you to exit this second window and have returned to the Page Designer, place the cursor inside District's 20-character long answer field on-screen and press <F5> again to re-edit this window.)

The "Entry Method" parameter is where you define the method in which the user can enter answers. The word "Keyboard" is written there now, but we don't want the user to bother with a keyboard. Instead, we will later create a list of possible answers that we will display to the user for him or her to choose from with a touch of a finger. This list is called a library.

Look at the very bottom line on the screen. It says to press the <SPACEBAR> to see the available options. Well, press the <SPACEBAR> twice. Did you notice that "Entry Method" changed from "Keyboard" to "File" and then to "Library"? "Library" is the option we want. Press <RETURN> to register this as our choice.

A third window pops up.

This is where we must decide on which library the user is to choose a district name from. To make things easier for us to remember later on, let's name the library with the same name as the answer it will be associated with. Enter "District" as the name of the library and press <RETURN>. The library is now created, but it is empty (we shall build it later).

When this question will be asked, there could be cases where the library won't contain the district name the user wants to enter. In such a case, we could permit the user to type in this district name which isn't in our library. This is what the "Allow User Keyboard Input" means. Set to "Yes" using the spacebar once again, the user will have the choice of selecting a district name form the library or typing in his or her own. Set to "No", we restrict the user to choose a district from our library only. For our application, enter "No" in this parameter and press <RETURN>.

Now all three windows disappear and we are back in the Page Designer. Notice that our answer has been defined and is displayed on screen. The answer field is displayed using what is referred to as padding characters. All answer fields, regardless of type, will be displayed using padding characters.

If you've made any mistakes in the Answer Formatter, make sure the cursor is inside "District"'s answer field and press <F5>. You may then re-edit any parameter in the second and third windows.

CENTERING

Once you are back in the Page Designer, the final function to perform is to center our first question and answer. First press the <ALT> key and then hit the letter C, keeping the <ALT> key depressed at the same time (this will be represented as <ALT-C> from now on). Your screen should look like this:

---

District:

========= Page: 1 === Line: 1 === Column: 40 === Mode: Insert ===
<F2> = Help   <ESC> = Cancel   <F5> = Enter/Edit Answer

---

FIG. 2.12

THE NEXT THREE QUESTIONS

Next we will want data on the adults; namely age, gender, and employment status of each one. These three can be answered with multiple-choices. Let us define each answer one at a time.

[Notice that the first status line (line 22 at the bottom) contains counters. These counters tell you what page, line and column the cursor is positioned at.]

A QUESTION OF AGE

For the next question, position the cursor at line 4 and column 15. Type in the word "Age:" and skip two spaces. You should now be on line 4 in column 21.

The question "Age:" will be a multiple choice question. The multiple choices will be "18-30", "31-45", and "45+". Press <F5> to call up the Answer Formatter's first window to begin the process of defining these choices. FIG. 2.13 shows that DataSlate ™ will display.

The "Answer Name" parameter should have the value "Age" and the Question Sequence number should be 2 (as this will be the second question asked). Make sure this is so. Press <RETURN> for each parameter. "Answer Type" is to be Multiple, and so place the light bar on the option "Multiple" using the <DOWN-ARROW> key and press <RETURN>.

FIG. 2.14

FIG. 2.14 above shows the second window displayed: the parameters of the answer type Multiple. For now we can simply sip over all of these parameters because their default values are exactly what we want. Press <F1> to skip over every parameter.
DRAWING FRAMES Now, just for a second, refer back to FIG. 1.1. Notice the frames that border the multiple choice answers "Male" and "Female"? These had to be drawn, and now this is what we are going to do for each of the responses to the question "Age:".

Your screen now presents you with four styles of frames. Do you see the arrow underneath the first one? Use this arrow to select a frame style you wish to draw with. For our example, we will use the first style, and so just press <RETURN> to select it.

Now, since we want to include choices like "18–35" to answer the "Age:" question, we must make certain that the frames we draw are big enough to fit our choices in. In this example, the frame must contain at least 5 characters of horizontal space. Since the left and right borders of the frame will take a space each. This adds up to a total of 7 spaces. The frame, then, must be 7 spaces across. Since you are now in column 21, 7 spaces will bring this to column 27 (when you include column 21). Move the cursor over to column 27. The frame will expand accordingly.

The frame takes up lines 4 and 5. Where will our choice "18–35" be written? We need a blank line inside the frame. Press the <DOWN-ARROW> key once. Now the frame takes up lines 4, 5, and 6. We want our choice to be written on line 5, columns 22 and 26.

But don't worry because DataSlate ™ will take care of this automatically. All you need to do now is press <RETURN> and type in "18–35" next to the parameter "Answer Text" that appears in the window shown below:

FIG. 2.15

Press <F1> after typing "18–35" to skip over the Return Value and GoTo parameters. The frame of our first multiple choice is displayed using the padding character.

[N.B. If, by chance, you have positioned the answer field wrong and you wish to delete it, position the cursor anywhere inside the answer field and press <F6>. Answer "Yes" to the warning that makes sure you want to delete the answer field, and press <RETURN>. Reposition the cursor, and press <F5> again to redefine the answer field as outlined above.]
COPYING FRAMES Now let's define the two other choices for "Age:". What we are going to do is copy the frame we have just created. Then the window of FIG. 2.15 above will appear again for the new frame, and we will enter "36–50". We will repeat all of this again for the choice "50+".

With the cursor still inside the first answer field of "Age:", press <ALT-R>. You are now in the Page Designer's "Copy Answers" mode. All you need to do now is reposition the cursor to where you want the top left hand corner of the new frame to be. If this sounds confusing, dont't worry, just follow these instructions: position the cursor on line 4 and column 35 and press <F5>. Do you see how the cursor is in the new frame's top left hand corner? Now, we must specify this new frame's "Answer Text", which is to be "36–50", the next age choice. Type this in and press <F1> to skip over the other parameters. The second frame is copies from the first and displayed.

[N.B. If you decide to delete this second this second frame because it is not in the correct position, leave the "Copy Answers" mode by hitting <RETURN>. Make sure the cursor is inside the answer field frame and press <F6> to delete. Answer "Yes" to the warning that makes sure you want to delete the frame. To redefine it, place the cursor back in the first answer field frame and press <ALT-R> again, and proceed as outlined in the previous paragraph above.]

For the last choice, we move the cursor again to where we wish the last frame to be (we are still in "Copy Answers" mode and will remain so until we press <RETURN>. Move the cursor over to column 49 and hit <F5>. Type in "50+" in the "Answer Text" mode (and notice that the "Mode:" indicator at the lower right of the screen changed from "Copy Answers" mode to either "Insert" or "Overwrite" mode), and we are ready to define the next question.
THE THIRD QUESTION The Next question is gender, and as we have discussed above, there will be no question text for this one. Therefore, we are to position the cursor where we wish the choices "Male" and "Female" to appear.

Position the cursor on line 8, column 5, and press <F5>. The Answer Formatter window pops up. Enter "Gender" in the space next to "Answer Name", and press <RETURN> twice to register this name and to skip over "Question Sequence #", which already had the correct value of 3. Select "Multiple" as the answer Type using the <ARROW> keys and press <RETURN>. Hit <F1> to pass over Multiple's set of parameters to the frame style selection. Let's be consistent and choose the same frame style as before; press <RETURN> to select the first frame style.
A QUESTION OF SIZE When you draw frames for multiple choice questions keep in mind that, for esthetic reasons, the other choices in the set should have frames of the same size. Therefore, note the length of the choice with the longer text that will have to fit in the frame.

In our case here, the choice "Female" is longer than "Male", and so the frame must be designed with this in mind. Since "Female" is 6 characters long, and the frame itself will take up 2 horizontal spaces, the frame must be at least 8 characters in length.

Since you are at column 5, move the cursor over to column 12, for a total length of 8 characters (including column 5). Move the cursor one line (not two) down to make room for the text, and hit <RETURN> to finish drawing. Enter "Male" for the parameter "Answer Text", and then enter"1" as its return value. Therefore, if the user selects this answer, it will be represented as "1" in the database.

Now we are going to copy this frame for the second choice. With the cursor still inside the field, press <ALT-R>. Move the cursor over to column 20 on line 8 and press <F5> to copy. Enter "Female" next to "Answer Text" in the window that appears and enter "2" as its return value. Not hit <RETURN> twice to leave "Copy Answers" mode, and we are ready for our fourth question.
THE FOURTH QUESTION The fourth question is the same in principle as the Male/Female question, except the choices are "Employed" and "Unemployed".

Place the cursor at column 47 (still on line 8) and define the fourth question (the answer name could be "Job-Status") using the same procedure outlined above.

The frame should stretch from column 47 to column 58, inclusive.

The second choice ("Unemployed") should be copied from the first (using <ALT-R>) into column 65.

THE FIFTH QUESTION
SOME MINOR BRANCHING

The fifth question is "Children" and uses the same principles as the last three questions, but with a slight twist. This time we will demonstrate the use of branching instructions.

The question gives basically four choices for the number of children in the household: 0, 1, 2, or MORE. Here is the twist: if 0, 1, or 2 is chosen, the user will carry on to the last question of the survey ("Condition of Property"). If, however, the user chooses MORE, a supplementary question will be asked with which the user will specify the number of children in the household by choosing from a list of higher numbers (4, 5, 6, etc) that will pop up. After that choice is made, the last question will be asked, and the survey will be complete.

Let us design this question. Position the cursor on line 14 and in column 8. Type in "Children:" and then skip 6 spaces. You should be in column 23 now. Press <F5> to create the answer field of the first choice.

The Answer Name is "Children" and the Question Sequence Number is 5. Select Multiple as the Answer Type and Press <RETURN>. Press <F1> to skip over Multiple's parameters, and select the first frame style by pressing <RETURN>. The word "MORE" must be able to fit inside the frames for this question, so make certain that the frame is 6 characters long (the frame should therefore start in column 23 and end in column 28). Do not forget to press <DOWN-ARROW> once to free one line for the text of the choices. Press <RETURN> once the frame is complete. Enter "0" as the Answer Text for this first frame, and press <F1>.

Now we simply copy this frame three times for the remaining three choices of 1,2, and MORE. With the cursor still in the first frame, press <ALT-R>. Position the cursor where we want the next frame to be, namely line 14, column 35. Press <F5> to copy the frame. Enter 1 as the Answer Text and press <F1>. The next frame is to be positioned on line 14, column 47, with Answer Text of 2.

THE GoTo Parameter

The fourth frame is copied in the same manner, with a slight exception. Copy the frame into column 59. Type in the word MORE as the Answer Text. Press <RETURN> twice to get to the GoTo parameter. Notice that all this time this parameter was always set to "Next Question" as it is now. This is what control the logical flow of the application's questions (see Section 1.6). It indicates what the following question will be. This time, if the user chooses the choice MORE as the answer to the question "Children", we want the survey to ask a supplementary question before proceeding to the last question as it normally would have done. To avoid confusion, let's give this supplementary question a sequence number of 50. The normal course of the application will run from question 1 to question 6. Depending on the answer of question 5 (number of children), question 50 may be asked.

Now then, we must specify that question 50 is the question to go to if the choice MORE is selected. The default value of GoTo is "Next Question". Press the <SPACEBAR> twice to change this value to "Question #". Press <RETURN>. Type in the number 50 and press <RETURN>. It's as easy as that.

THE SUPPLEMENTARY QUESTION, #50

Press <RETURN> to leave the "Copy Answers" mode. Move the cursor over to column 71 on line 14. It is here that we shall create the answer field for question 50. Press <F5> to call up the Answer Formatter. The Answer Name to be typed here should be "Child2", for the sake of this demonstration. The Question Sequence number is 50 and this time you must type it in because DataSlate ™ was expecting the next question to be defined, which would have been number 6, which we shall do next. Type in the number 50 in its place and press <RETURN>. Select Numeric as the Answer Type and press <RETURN>.

"Numeric"'s parameters will appear in a pop-up window.

Only two parameters concern us here, and they are the GoTo parameter and the Entry Method parameter. Press <RETURN> the number of times that is takes to get your cursor down to the GoTo parameter. The current value says "Next Question". The last question of the survey is "Condition of Property", which has the sequence number of 6. Therefore, we must go to question 6 after this one is answered. So, press the <SPACEBAR> twice to get "Question #" as the GoTo parameter, and press <RETURN>. Enter the number 6 next to "Question #" and press <RETURN>.

Now the cursor should be in the Entry Method parameter. We want to present the user with a list of numbers (higher than 2) from which the number of children can be picked. This list is a library. Press the <SPACEBAR> twice to change its value to "Library". Press <RETURN> to register this choice, and then type in "Children" as the name of the library. Once that is done, hit <F1> to leave this window (we won't allow the user additional keyboard input, so that parameter can keep the value of 'No'). Two padding characters, representing where the actual number of children will appear once entered by the user, appear next to the multiple choices.

THE LAST QUESTION

Let us now define question 6 (the last question of the survey).

A SCALED-DOWN QUESTION

This type of question will display a ladder scale from 0 to 10, because "Condition of Property" can be best answered as a value from 0 to 10 (0 being the worst condition possible, and 10, being the best). The user will glide an X (using a finger) to the value he or she considers to be the answer. For our application, the question is "Condition of Property". The resulting answer will be indicated by using the scale, and the answer will be a value form 0 to 10 in increments of 0.5.

Place the cursor on line 18 and column 18. Type in the question, "Condition of Property:", skip two spaces and hit <F5> at column 42 on line 18. Enter "Property" as the Answer Name and press <RETURN>. Make sure you enter the number 6 as the Question Sequence number. Select Scale as the answer Type, and press <RETURN>.

The Scale Window will pop up, showing what the scale looks like and four of its parameters. Press <RETURN> twice to place the cursor in the GoTo parameter. This question is the last question of the application, and so the GoTo parameter must reflect this. Hit the <SPACEBAR> five times to change the value of the parameter to "End Program". When the system will reach this parameter during execution, the application will terminate. Hit <F1> to leave this window.

There are two final things to do: define a loop for the three questions concerning adults (age, gender and job status) and build the "District" and "Children" libraries.

LET'S DEFINE A LOOP

What is a loop and why do we need it? Well, a loop is simply a group of questions that will be asked over and over (creating new records each time) as long as the user wants.

As it stands now, our application records information only for one adult per household. To record information for more than a single adult per house, we must ask the second, third and fourth questions for each adult. Hence, questions 2, 3 and 4 must be in a loop.

The way this works for the user is as follows: the first adult's information will be entered. Then, a prompt will appear, asking "Another adult?". The user will have three options: yes, no or review. If the user answers yes, the loop (questions 2,3 and 4) will execute once more, recording information about another adult. If the user answers no, the loop will terminate and the next question ("Children") will be asked. If the user answers 'review', the user will be given the chance to edit all of the information previously entered.

LOOP DEFINITION

Let's define a loop for questions 2, 3 and 4. Without worrying about the position of the cursor, press <ALT-L>.

Since our loop will start with question 2, enter 2 in the From Question # parameter and press <RETURN>. Our loop shall end with question 4, and so enter 4 in the To Question # parameter and press <RETURN>. Below, a second window that keeps track of loops shall appear, showing this loop as the first 'Existing Loop'.

Skip over the Loop Type parameter for now by pressing <RETURN>. Type in "Another adult?" in the Prompt parameter, replacing the more ambiguous "Another item?" At the end of each iteration of the loop, it is this prompt that the user will see displayed. The user will then answer either 'Yes', 'No' or 'Review'. Press <F4> to exit the loop definition window.

THE LIBRARIES

Now we are ready to build the two libraries. First, however, we must save the application and exit the Page Designer. Press <F4> and select the "Save & Quit" from the menu that appears. The "Create/Edit Applications" screen will return. Press the letter Q to select the Quit option. The Applications Generator Menu will return, after which you should press 7 to quit back to the Main Menu.

Select the option "Library Maintenance" from the Main Menu by pressing the number 2. The Library Maintenance Menu will appear. The first option, "Sequential Libraries", is the one we want, and so hit <RETURN> or press the number 1 for this option.

The two libraries, "District" and "Children", are already created; they are simply empty. We must now build them.

BUILDING THE "DISTRICT" LIBRARY

Let's build the "District" library first. Notice that the light bar is on the "Next" option. Press <RETURN> twice and the "District" library will be called up on the screen. The options "Next" and "Prev" simply go forwards and backwards respectively throughout the library listing. Currently, our library listing contains only two existing libraries, "District" and "Children".

Now that the "District" library is up on the screen, select the "Content" option by pressing the letter C (or moving the light bar over to it and pressing <RETURN>). A two-option menu will appear consisting of the choices "Main Library" and "Sub-Libraries". Press <RETURN> to select the first choice as we do not need sub-libraries for this application.

To build up entries in this library, press the letter A (to select the option "Add"). The cursor is now next to the Entry parameter. This is where you type in the library entries. We will enter the names of the districts that are going to be surveyed. After a name is entered, press <RETURN> twice to skip over the Return Value parameter and on to entering the next entry. For example, type in "Arlington" as a district. Hit <RETURN> twice. Now type in "Cambridge". Do the same for "Woburn" and "Burlington". Now we have a four entry library. For this example, we consider this to be enough. Press <F4> to exit the window and return to the menu below it.

If you made any mistakes entering entries, use the "Next" and "Prev" option (or the <UP-ARROW> and <DOWN-ARROW> keys for the same effect) to scroll through the library to the entry you want. Select the "Modify" option to re-edit the entry (pressing <F4> when done), or select the "Delete" option to erase the entry.

Press Q while in the menu to quit the "Content" option when you are finished building the "District" library.

BUILDING THE "CHILDREN" LIBRARY

Now we are back to the screen of FIG. 2.20 above. Press the letter P (for "Prev") to call up the "Children" library on screen. Press the letter C for the "Content" option and to pop up the "Main Library/Sub-libraries" menu again. Press <RETURN> to choose the first option, and then press A to begin adding new entries, as we did previously.

This library consists of numbers higher than 2, for if you'll recall, this library will be displayed to the user if the household has more than 2 children. To avoid forcing the user to use the keyboard, we will create entries consisting of the numbers 3 to 10 (a reasonably high number). Do so in the exact same manner as outline for the "District" library's entries.

After quitting the "Content" option once again and finding yourself back to the screen of FIG. 2.20, press Q to quit back to the Library Maintenance Menu, depress 4 to quit back to the Main Menu.

The Survey application is completed. We need only to compile and download it.

COMPILING THE APPLICATION

To compile the application, select "Application Generator" from the Main Menu. Select the third option, "Compile", by pressing the number 3 from the Application Generator Menu.

Type in the name "Survey" and press <RETURN>. The application will be compiled into 3 runtime files. Once completed, you will find yourself back in the Applications Generator Menu.

DOWNLOADING THE APPLICATION

Press the number 6 to select the "Download" option from the Applications Generator Menu. Type in the name "Survey" once more, press <RETURN> twice (skipping over the User parameter), and specify a pathname for the compiled version. Making sure that a floppy diskette is inserted in the drive specified, press <RETURN> and the application will be downloaded to the floppy.

VOILA!

Your application, now on diskette, is ready to be executed on the Datellite ™.

What is intended to be covered by Letters Patent is:

1. A self-contained, general-purpose, portable, keyboardless computer comprising:
   A. a combined input/output device including a display for displaying outputs on a touch-sensitive screen, said screen superposed over said display and configured for manual entry of responses;
   B. memory means for storing any of a plurality of data collection applications, an operating system and data, said data collection applications determining contents and formats of said outputs displayed on said screen;
   C. a central processing unit connected to said memory means and said input/output device for executing said data collection applications stored in said memory means; and
   D. an application generator for generating said data collection applications and for creating different functional libraries relating to said contents and said formats displayed on said screen, said application generator operating in conjunction with said operating system to partition said memory means for storing said data collection applications and libraries.

2. The self-contained, general-purpose, portable, keyboardless computer of claim 1 further comprising means for powering said input/output device and said processing unit.

3. The self-contained, general-purpose, portable, keyboardless computer of claim 2 further comprising a computer enclosure for housing said memory means, said central processing unit, said input/output device and said powering means, said enclosure having a window disposed within a top surface thereof for rendering said display visible and said touch sensitive screen manually accessible.

4. The self-contained, general-purpose, portable, keyboardless computer of claim 3 wherein said enclosure includes a substantially planar surface defining said window, and said window constitutes at least 30% of said top surface's surface area.

5. The self-contained, general-purpose, portable, keyboardless computer of claim 1 wherein said application generator includes means for personalizing said libraries, together with said contents and said formats displayed on said screen, according to a specific data collection application executed by said central processing unit.

6. The self-contained, general-purpose, portable, keyboardless computer of claim 1 wherein a first library created by said application generator includes a sequential library of possible responses configured for display on said screen in selected ones of said formats.

7. The self-contained, general-purpose, portable, keyboardless computer of claim 6 wherein a second library created by said application generator includes a consequential library of one of actions and executable instructions associated with said possible responses for changing the flow of said data collection applications.

8. The self-contained, general-purpose, portable, keyboardless computer of claim 7 wherein said possible responses are one of text and pictograms.

9. The self-contained, general-purpose, portable, keyboardless computer of claim 8 wherein said pictograms comprise graphical images of objects and wherein a third library created by said application generator includes a pictogram library of said pictograms.

10. The self-contained, general-purpose, portable, keyboardless computer of claim 9 wherein a fourth library created by said application generator includes a syntax library of predefined message outputs displayed on said screen, and whereby changes to said predefined message outputs are effected by accessing said syntax library and manually entering desired message outputs.

11. The self-contained, general-purpose, portable, keyboardless computer of claim 10 wherein said application generator further includes means for cross-referencing said responses with one of said libraries of said possible responses.

12. A portable, keyboardless, computer comprising:
   an input/output device for displaying inquiries on a touch-sensitive screen, said screen configured for entry of responses to said inquiries;
   a memory for storing at least one data collection application configured to determine contents and formats of said inquiries displayed on said screen;
   a processor coupled to said memory and said input/output device for executing said data collection application; and
   an application generator for generating said data collection application and for creating different functional libraries relating to said contents and said formats displayed on said screen, said application generator further comprising means for cross-referencing responses to said inquiries with possible responses from one of said libraries; and
   a run-time utility operating in conjunction with said processor to execute said application and said libraries to facilitate data collection operations.

13. The computer of claim 12 wherein said different functional libraries include:
   a sequential library of said possible responses configured for display on said screen in selected ones of said formats;
   a consequential library of one of actions and executable instructions associated with said possible responses for changing the flow of said data collection applications; and
   a pictogram library for storing graphical images of objects.

14. A portable, keyboardless, data collection unit comprising:
   an input/output device for displaying and entering information on a touch-sensitive screen;
   a memory for storing a data collection application and various functional libraries relating to contents and formats of said information displayed on said screen;
   a processor coupled to said memory and said input/output device for executing said data collection application; and
   a run-time utility operating in conjunction with said processor to execute said application and said libraries to facilitate data collection operations.

15. The unit of claim 14 wherein said libraries include:
 a sequential library of possible responses configured for display on said screen in selected ones of said formats;
 a consequential library of one of actions and executable instructions associated with said possible responses for changing the flow of said data collection application; and
 a pictogram library of pictograms.

* * * * *

(12) EX PARTE REEXAMINATION CERTIFICATE (9568th)
United States Patent
Clough et al.

(10) Number: US 5,379,057 C1
(45) Certificate Issued: Mar. 20, 2013

(54) PORTABLE COMPUTER WITH TOUCH SCREEN AND COMPUTER SYSTEM EMPLOYING SAME

(75) Inventors: William A. Clough, Ontario (CA); Daneil Ouelette, St. Luc Quebec (CA); Serge De La Sablonniere, Ville d'Anjou (CA)

(73) Assignee: Typhonn Tunes, Inc., Carson City, NV (US)

Reexamination Request:
No. 90/009,463, May 13, 2009

Reexamination Certificate for:
Patent No.: 5,379,057
Issued: Jan. 3, 1995
Appl. No.: 08/098,219
Filed: Jul. 28, 1993

Related U.S. Application Data

(63) Continuation of application No. 07/890,311, filed on May 26, 1992, now abandoned, which is a continuation of application No. 07/731,375, filed on Jul. 16, 1991, now abandoned, which is a continuation of application No. 07/271,237, filed on Nov. 14, 1988, now abandoned.

(51) Int. Cl.
*G06F 15/02* (2006.01)

(52) U.S. Cl.
USPC .......................................................... 345/173

(58) Field of Classification Search .................... None
See application file for complete search history.

(56) References Cited

To view the complete listing of prior art documents cited during the proceeding for Reexamination Control Number 90/009,463, please refer to the USPTO's public Patent Application Information Retrieval (PAIR) system under the Display References tab.

*Primary Examiner* — Fred Ferris

(57) ABSTRACT

A portable, self-contained, general-purpose, keyboardless computer utilizes a touch screen display for data entry purposes. An application generator allows the user to develop data entry applications by combining the features of sequential libraries, consequential libraries, help libraries, syntax libraries, and pictogram libraries into an integrated data entry application. A run time utility allows the processor to execute the data entry application.

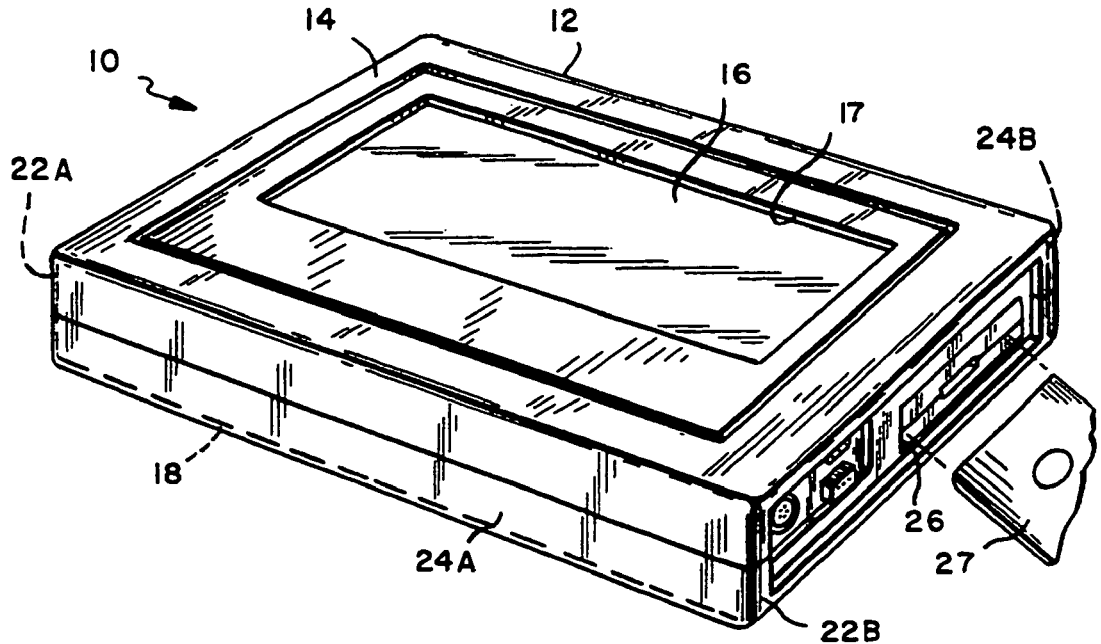

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 14 and 15 are cancelled.

Claims 1-13 were not reexamined.

\* \* \* \* \*